US011575558B1

(12) United States Patent
Gillies et al.

(10) Patent No.: US 11,575,558 B1
(45) Date of Patent: Feb. 7, 2023

(54) TEMPORARY SUPPRESSION OF SECURITY EVENT NOTIFICATIONS

(71) Applicant: AMAZON TECHNOLOGIES, INC., Seattle, WA (US)

(72) Inventors: Ryan Gillies, Pacific Palisades, CA (US); Elliott Lemberger, Santa Monica, CA (US); Aaron Harpole, Santa Monica, CA (US); Mary Nell Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/250,915

(22) Filed: Jan. 17, 2019

Related U.S. Application Data

(60) Provisional application No. 62/623,292, filed on Jan. 29, 2018, provisional application No. 62/618,562, filed on Jan. 17, 2018.

(51) Int. Cl.
| | |
|---|---|
| *H04L 41/0604* | (2022.01) |
| *H04L 41/069* | (2022.01) |
| *H04L 12/28* | (2006.01) |
| *H04W 24/10* | (2009.01) |
| *H04B 17/318* | (2015.01) |

(52) U.S. Cl.
CPC ...... *H04L 41/0622* (2013.01); *H04L 12/2803* (2013.01); *H04L 41/069* (2013.01); *H04W 24/10* (2013.01); *H04B 17/318* (2015.01); *H04L 2012/2841* (2013.01)

(58) Field of Classification Search
USPC .......................................................... 709/224
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |

(Continued)

FOREIGN PATENT DOCUMENTS

| | | |
|---|---|---|
| CN | 2585521 | 11/2003 |
| CN | 2585521 Y | 11/2003 |

(Continued)

*Primary Examiner* — Hermon Asres
(74) *Attorney, Agent, or Firm* — Lee & Hayes, P.C.

(57) ABSTRACT

Temporarily suppressing and/or disabling notifications to a client device of events detected by a security device monitoring an environment. The notifications may be disabled and/or suppressed based upon a request from a user of the client device, or when the client device is nearby the security device. The user may request that notifications are suppressed for a definable suppression duration, wherein a timer is started to run for the suppression duration, and notifications are suppressed while the timer is running. When the client device is nearby the security device, suppression of the notifications for other users may be defined by a user-configurable table. A notification from a security device may include a suppress button to suppress notifications from that security device for a suppression period.

19 Claims, 18 Drawing Sheets

(56) References Cited

U.S. PATENT DOCUMENTS

| | | |
|---|---|---|
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,347,317 B1 | 1/2013 | Balaji et al. |
| 8,619,136 B2 | 12/2013 | Howarter et al. |
| 8,780,201 B1* | 7/2014 | Scalisi .................. H04N 7/186 |
| | | 348/143 |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,351,110 B2 | 5/2016 | Masterman |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2008/0014848 A1 | 6/2008 | Ramanathan et al. |
| 2013/0057695 A1 | 3/2013 | Huisking |
| 2015/0035987 A1 | 2/2015 | Fernandez |
| 2015/0109112 A1* | 4/2015 | Fadell .................. G08B 19/005 |
| | | 340/328 |
| 2015/0180976 A1* | 6/2015 | Xiao ...................... H04L 67/52 |
| | | 709/203 |
| 2016/0105406 A1* | 4/2016 | Smith .................... H04W 8/26 |
| | | 713/171 |
| 2016/0303412 A1* | 10/2016 | Schmitt ................ A62C 35/60 |
| 2016/0371967 A1* | 12/2016 | Narang .................. G08B 3/10 |
| 2017/0243472 A1* | 8/2017 | Davies ................ G08B 25/016 |
| 2018/0061158 A1* | 3/2018 | Greene ............. G06K 9/00885 |

FOREIGN PATENT DOCUMENTS

| | | |
|---|---|---|
| CN | 2792061 | 6/2006 |
| CN | 2792061 Y | 6/2006 |
| EP | 0944883 B1 | 6/1998 |
| EP | 0944883 | 9/1999 |
| EP | 1480462 | 11/2004 |
| EP | 1480462 A1 | 11/2004 |
| GB | 2286283 | 8/1995 |
| GB | 2286283 A | 8/1995 |
| GB | 2354394 | 3/2001 |
| GB | 2354394 A | 3/2001 |
| GB | 2357387 | 6/2001 |
| GB | 2357387 A | 6/2001 |
| GB | 2400958 | 10/2004 |
| GB | 2400958 A | 10/2004 |
| JP | 2001-103463 A2 | 4/2001 |
| JP | 2001103463 | 4/2001 |
| JP | 2002-033839 A2 | 1/2002 |
| JP | 2002033839 | 1/2002 |
| JP | 2002-125059 A2 | 4/2002 |
| JP | 2002125059 | 4/2002 |
| JP | 2002-342863 A2 | 11/2002 |
| JP | 2002-344640 A2 | 11/2002 |
| JP | 2002342863 | 11/2002 |
| JP | 2002344640 | 11/2002 |
| JP | 2002-354137 A2 | 12/2002 |
| JP | 2002-368890 A2 | 12/2002 |
| JP | 2002354137 | 12/2002 |
| JP | 2002368890 | 12/2002 |
| JP | 2003-283696 A2 | 10/2003 |
| JP | 2003283696 | 10/2003 |
| JP | 2004-128835 A | 4/2004 |
| JP | 2004128835 | 4/2004 |
| JP | 2005-341040 A | 12/2005 |
| JP | 2005341040 | 12/2005 |
| JP | 2006-147650 A | 6/2006 |
| JP | 2006147650 | 6/2006 |
| JP | 2006-262342 A | 9/2006 |
| JP | 2006262342 | 9/2006 |
| JP | 09-008925 A | 1/2009 |
| JP | 2009008925 | 1/2009 |
| WO | WO9839894 | 9/1998 |
| WO | WO 199839894 A1 | 9/1998 |
| WO | WO0113638 | 2/2001 |
| WO | WO 0113638 A1 | 2/2001 |
| WO | WO0193220 | 12/2001 |
| WO | WO 200193220 A1 | 12/2001 |
| WO | WO02085019 | 10/2002 |
| WO | WO 2002085019 A1 | 10/2002 |
| WO | WO03028375 | 4/2003 |
| WO | WO 2003028375 A1 | 4/2003 |
| WO | WO03096696 | 11/2003 |
| WO | WO 2003096696 A1 | 11/2003 |
| WO | WO2006038760 | 4/2006 |
| WO | WO 2006038760 A1 | 4/2006 |
| WO | WO2006067782 | 6/2006 |
| WO | WO 2006067782 A1 | 6/2006 |

(56) References Cited

FOREIGN PATENT DOCUMENTS

WO     WO 2007125143 A1    8/2007
WO     WO2007125143      11/2007

* cited by examiner

714

|  | NOTIFIED DEVICE | | |
|---|---|---|---|
| DETECTED DEVICE | UNIQUE ID 744(1) | UNIQUE ID 744(2) | UNIQUE ID 744(3) |
| NONE | 🔩 | 🔩 | 🔩 |
| UNIQUE ID 744(1) | 804 ⊚ | 802 🔩 | 🔩 |
| UNIQUE ID 744(2) | 🔩 | ⊚ | 🔩 |
| UNIQUE ID 744(3) | 🔩 | ⊚ | ⊚ |

Figure 8

TEMPORARY SUPPRESSION OF SECURITY EVENT NOTIFICATIONS

RELATED APPLICATIONS

This application claims priority to, and benefits from, provisional patent application Ser. No. 62/618,562, filed on Jan. 17, 2018, and provisional patent application Ser. No. 62/623,292, filed on Jan. 29, 2018. The entirety of each of these applications is incorporated herein by reference.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as video doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a video doorbell unit at the entrance to the home, acts as a powerful deterrent against would-be burglars.

BRIEF DESCRIPTION OF THE FIGURES

FIG. 8 shows the notification table of FIG. 7, in example detail;

DETAILED DESCRIPTION OF THE EMBODIMENTS

Figure 1:
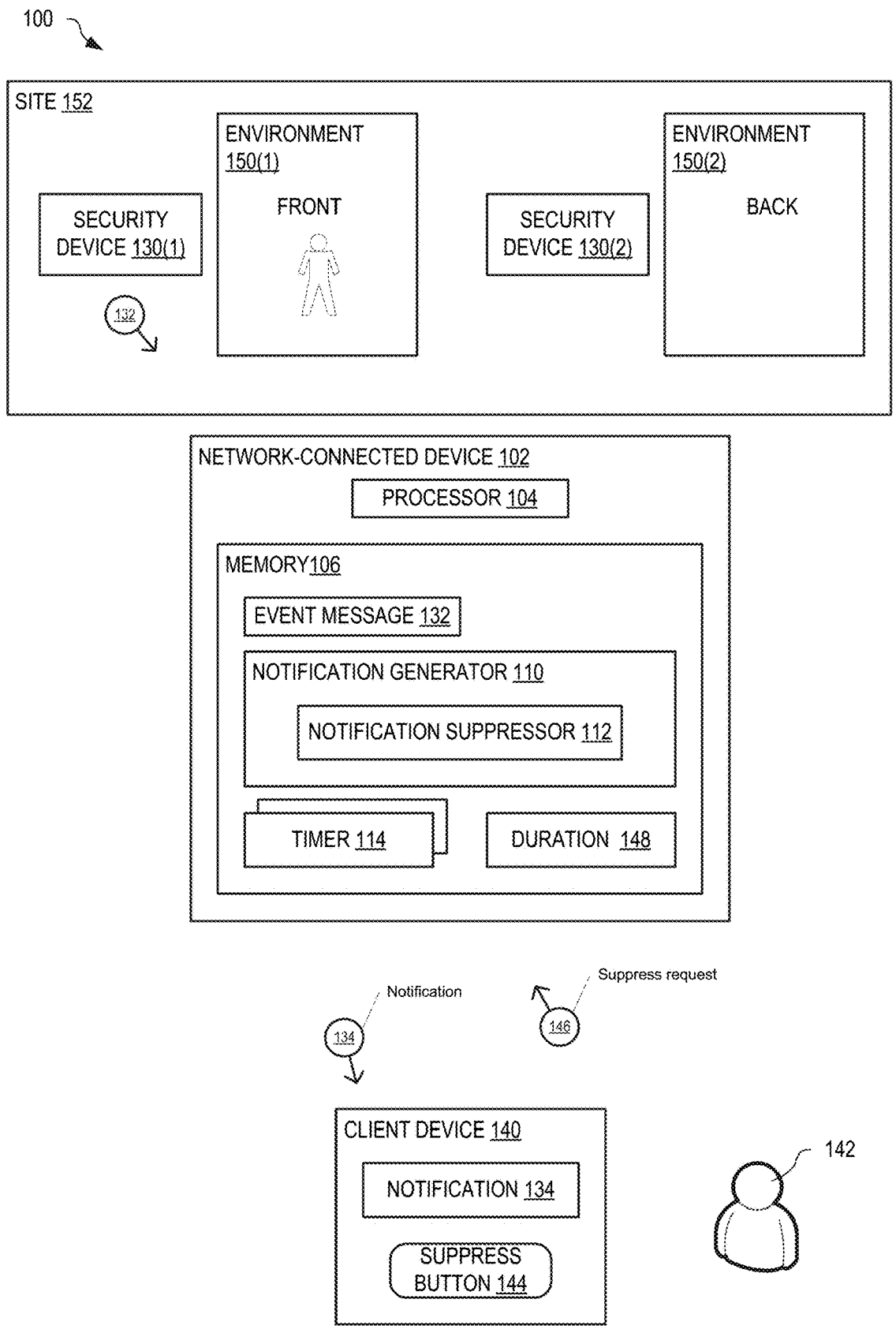
FIG. 1 is a functional block diagram illustrating one example system for temporary suppression of security event notifications, in an embodiment.

The following detailed description describes the present embodiments with reference to the drawings. In the drawings, reference numbers label elements of the present embodiments. These reference numbers are reproduced below in connection with the discussion of the corresponding drawing features.

Security devices are frequently configured to send a notification to a client device when a person is detected within an environment monitored by the security device. Users of such devices typically do not want to receive notifications when they themselves are detected by the security device. To reduce unwanted notifications, some security devices can be programmed to generate notifications only during certain hours. For example, where the security device is a video doorbell positioned at a front door of a residence, the video doorbell may be scheduled to generate notifications only when occupants of the residence are not typically at home, such as between 8:00 AM and 5:00 PM Monday through Friday. However, if one or more of the occupants is at the residence during these hours, unwanted notifications will be generated. In another example, where the security device is a camera that monitors a backyard of the residence, when the occupant is active in the backyard, such as while cutting the grass, the security device will generate unwanted notifications as the occupant moves about the backyard.

One way to reduce these unwanted notifications is to adjust the operational schedule of the security device for temporary periods of expected activity. However, this process is inconvenient, because it typically requires the user to open an application on the client device associated with the security device and then navigate through several screens before reaching the screen where the adjustment to the operational schedule of the security device can be made. Worse, adjusting the operational schedule of the security device creates the risk that the occupant will forget to return the schedule to normal, thereby leaving the environment unmonitored.

Accordingly, one aspect of the present embodiments includes the realization that when a security device is configured to continuously monitor an environment, some notifications of events detected within the monitored environment are not needed and may be a nuisance, such as when events are expected to occur. The present embodiments solve this problem by allowing a user to temporarily disable notification of events detected within the environment for a suppression duration. Advantageously, by suppressing notification of events detected by the security device for a suppression duration, the security device continually monitors the environment and the user is not annoyed by notification of events occurring during the suppression duration. A further advantage is that the user does not have to reactivate the security device after the suppression duration, and therefore the user cannot forget.

Another aspect of the present embodiments includes the realization that it would be beneficial for users to have a convenient way to temporarily disable notifications of events detected by a security device for a selectable suppression duration that starts immediately. The present embodiments provide this advantage by providing an application that runs on a client device (e.g., a smartphone or another portable communication device) of the user, and that allows the user to easily suppress notification of events detected by a security device for a selectable suppression duration that starts immediately. Advantageously, the client device may be carried by the user and accessed to easily suppress notification of events for a selectable suppression duration.

Another aspect of the present embodiments includes the realization that a user having a video doorbell doesn't need to receive notifications each time he or she enters or leaves his or her own residence. The present embodiments solve this problem by detecting when the user is nearby (e.g., geographically located near to) the security device and is therefore the likely cause of the event detected by the security device. When the user is detected nearby, the security device automatically disables notifications of events detected by the security device.

Another aspect of the present embodiments includes the realization that, where a security device detects that a user of the security device is nearby, the user (and/or other users) of the security device may not want to receive a notification of the event. The present embodiments solve this problem by determining whether the user is nearby the security device when the event is detected, and sending a notification of the event to the user (and/or other users) based upon a configurable table that defines who should, and who should not, be notified.

An owner of a property may configure a security device to monitor an environment of the property and send notifications when activity is detected within the environment. Such notifications are desirable when no activity is expected, or where notification of detected activity is desired. A property may have multiple security devices protecting different environments. For example, the owner may configure a first security device (e.g., a video doorbell) at a front door of a residence and position a second security device at a back door of the residence. The owner may thereby be notified of any activity at either door.

However, when activity within the monitored environment(s) is expected, notifications may not be desired. For example, when the owner or other occupants of the property are expected to be active in the monitored environment, notifications may not be desired, and may be a nuisance. Although the security device may allow active periods to be scheduled, where expected activity is temporary, configuring the schedule is often inconvenient, and must be changed again after the expected activity period to return the security device to normal operation. In certain scenarios, activity may also not permit scheduling, such as where the activity is unpredictable.

In one scenario, an environment monitored by a security device includes at least part of a lawn. When the lawn is being serviced (e.g., mowed, fertilized, etc.), this activity frequently triggers the security device, thereby generating frequent notifications for the owner and/or other parties configured to receive notifications from the security device. Such notifications are therefore more of a nuisance than of value to the owner, at least after the initial notification indicating that the activity has started. One aspect of the present embodiments includes the realization that it would be advantageous to have a convenient way to temporarily disable notifications from the security device for a selectable period of time. Continuing with this scenario, the owner may know that the lawn will be serviced on a particular day, but does not know exactly when. Rather than disable the notifications altogether for a significant portion of the day, and thus lose protection of that environment for that portion of the day, the owner may wait until a notification is received indicating that the servicing of the lawn has started, and then suppress notifications from that particular security device for a suppression duration corresponding to the time the lawn service is expected to take (e.g., thirty minutes, one hour, etc.). Since a suppression duration is defined, the owner does not have to remember to change the schedule again or to re-enable notifications. After the suppression duration has expired, any activity detected within that environment will again result in the owner receiving a notification.

FIG. 1 is a functional block diagram illustrating one example system 100 for temporary suppression of security event notifications. The system 100 includes a network-connected device 102 that is communicatively coupled with two security devices 130(1) and 130(2) located at a site 152, and a client device 140. The network-connected device 102 may be, for example, a cloud server, a smart-home hub, or a premises security hub, co-located at the site 152 with the security devices 130, or another similar device. The site 152 may be a residence, an office, a property, and so on. The network-connected device 102 is a computer that has a processor 104 communicatively coupled with a memory 106. In the example of FIG. 1, the security device 130(1) is configured to monitor an environment 150(1) at the site 152, and the security device 130(2) is configured to monitor an environment 150(2) at the site 152. The site 152 may have fewer or more security devices 130 without departing from the scope of the embodiments herein.

The network-connected device 102 includes a notification generator 110 that has machine readable instructions stored within the memory 106 and that are executed by the processor 104 to respond to event messages 132 received from the security devices 130. For example, upon receiving the event message 132 from the security device 130(1), the notification generator 110 generates and sends a notification 134 (e.g., a push notification) to at least one client device 140 corresponding to the security device 130(1). For example, a database (not shown for clarity of illustration) may define relationships between one or more security devices 130 and one or more client devices 140, indicating which client device 140 is to receive notifications of events received from each of the security devices 130. The client device 140 may automatically display the notification 134 to the user 142, such that the user 142 becomes aware of the activity detected by the security device 130(1) within the monitored environment 150(1).

A user 142 of the client device 140 may activate a suppress button 144 of the client device 140 to indicate that notifications 134 for the security device 130(1) are to be suppressed for a suppression duration 148, wherein the client device 140 sends a suppression request 146 to the notification generator 110. The suppression request 146 may identify the one or more security devices 130 for which notifications 134 are to be suppressed, and may define a suppression duration 148 that defines the period for which the notifications 134 are to be suppressed.

In response to the suppression request 146, the notification generator 110 invokes a notification suppressor 112 to start a timer 114 to run for the suppression duration 148. The notification suppressor 112 may have machine readable instructions stored within the memory 106 that are executed by the processor 104 to implement a suppression timer 114, within the memory 106, for example, that, once started, runs for the suppression duration 148 and then stops. The timer 114 specifically corresponds to the security devices 130 identified within the suppression request 146. In the example of FIG. 1, the timer 114 corresponds to the security device 130(1). The network-connected device 102 may use additional timers, similar to the timer 114, for each additional suppression request 146 that corresponds to other security devices 130. The notification suppressor 112 may evaluate the timer 114 when the event message 132 is received to determine whether the corresponding notification 134 should be suppressed. When the notification suppressor 112 determines that the timer 114 is running, the notification 134 corresponding to the event message 132 is not generated or sent to the client device 140.

After the timer 114 has run for the suppression duration 148 and has stopped, upon receiving a subsequent event message 132 from the security device 130(1), the notification suppressor 112 determines that the timer 114 is not running, and therefore allows the notification generator 110 to generate the corresponding notification 134 and send it to the client device 140 for display to the user 142.

In an alternative embodiment, the network-connected device 102 uses a real-time clock. When the suppression request 146 is received, the notification generator 110 determines a next active time by adding the suppression duration to a current value of the real-time clock. When the event message 132 is received, the notification suppressor 112 compares a current value of the real-time clock to the next active time, and when the current time is less than the next active time, the notification suppressor 112 suppresses the notification 134. Other methods of timing the duration of the suppression may be used without departing from the scope of the embodiments described herein.

In accordance with the embodiments described above, the user 142 has an easy, convenient way of temporarily suppressing notifications 134 of activity within the environment 150(1) that is detected by the security device 130(1) for the suppression duration 148, after which, the notifications 134 are no longer suppressed without further action by the user 142. Advantageously, the use of the timer 114 and the suppression duration 148 means that the user 142 does not have to remember to re-enable notifications, and therefore cannot forget.

Figure 2:
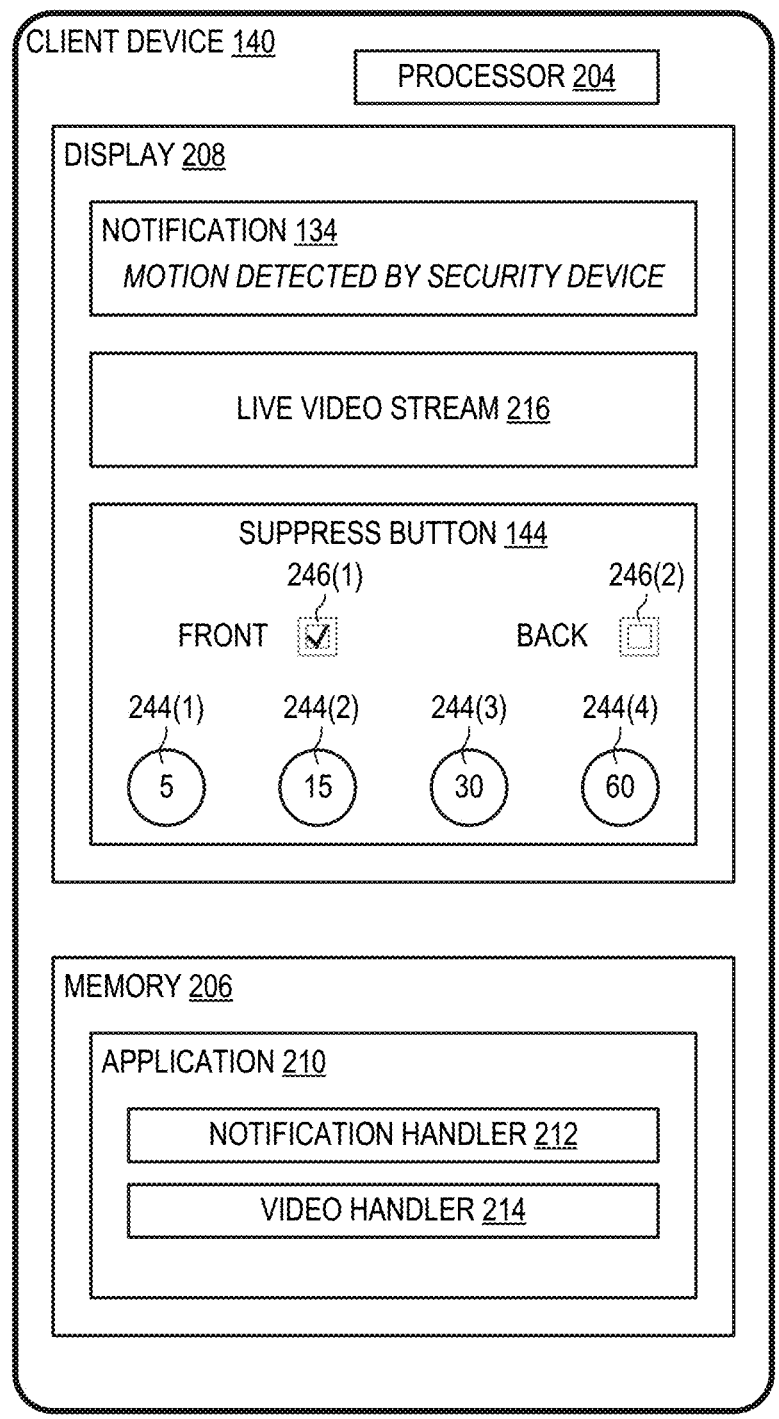
FIG. 2 is a functional block diagram of the client device shown in FIG. 1 configured for interacting with the user to temporarily suppress security event notifications, in an embodiment.

FIG. 2 is a functional block diagram illustrating the client device 140 of FIG. 1 in further example detail. The client device 140 may be, for example, a smartphone, a tablet, or another similar mobile computing and communication device, that includes a processor 204 communicatively coupled with a memory 206 and a display 208. The client device 140 includes an application 210 (e.g., an app that is downloaded onto the client device 140) that has machine readable instructions stored within the memory 206 that are executable by the processor 204 to interact with the user 142 and the network-connected device 102. The application 210 may be invoked by the user 142 in response to display of the notification 134 on the display 208. For example, the user 142 may tap on the notification 134 on the display 208 to invoke the application 210.

The application 210 may include a video handler 214 that allows the user 142 to display a live video stream 216 from the security device 130(1), via the network-connected device 102, for example, such that the user may view and/or hear the activity detected within the environment 150(1). See, for example the A/V recording and communication device 1400 of FIG. 14, described below. The application 210 may also include a notification handler 212 that displays the suppress button 144 on the display 208 to allow the user 142 to suppress further notifications. In the example of FIG. 2, the suppress button 144 is shown with four selectable duration buttons 244(1)-(4) that have duration values of five minutes, fifteen minutes, thirty minutes, and sixty minutes, respectively. These options may be displayed in other ways without departing from the scope hereof. For example, the suppress button 144 may include a pull down dialog that allows the user to select from a list of durations, or may provide a control that allows the user to vary the duration interactively. The suppress button 144 may also allow the user 142 to select more than one of the security devices 130 (where the user 142 has more than one security device 130) for which the notifications are to be suppressed.

As shown in the example of FIG. 2, a checkbox 246(1) corresponding to the security device 130(1) has been automatically selected, since the notification 134 corresponds to the event message 132 from the security device 130(1). A second checkbox 246(2), shown unselected, may be selected by the user 142 to also suppress notification of events detected by the security device 130(2). For example, where the user 142 believes that the activity at the site 152 will likely trigger both the security devices 130(1) and 130(2), the user may select both checkboxes 246(1) and 246(2) to suppress notifications from both security devices. The user 142 may then select one of the duration buttons 244(1)-(4) to suppress notifications from the selected security devices 130 for the corresponding suppression duration. The notification handler 212 then generates and sends the suppression request 146, identifying the selected security device 130 and defining the suppression duration 148, to the network-connected device 102. In certain embodiments, the notification handler 212 may interactively allow the user 142 to modify and/or cancel the notification suppression.

Figure 3:
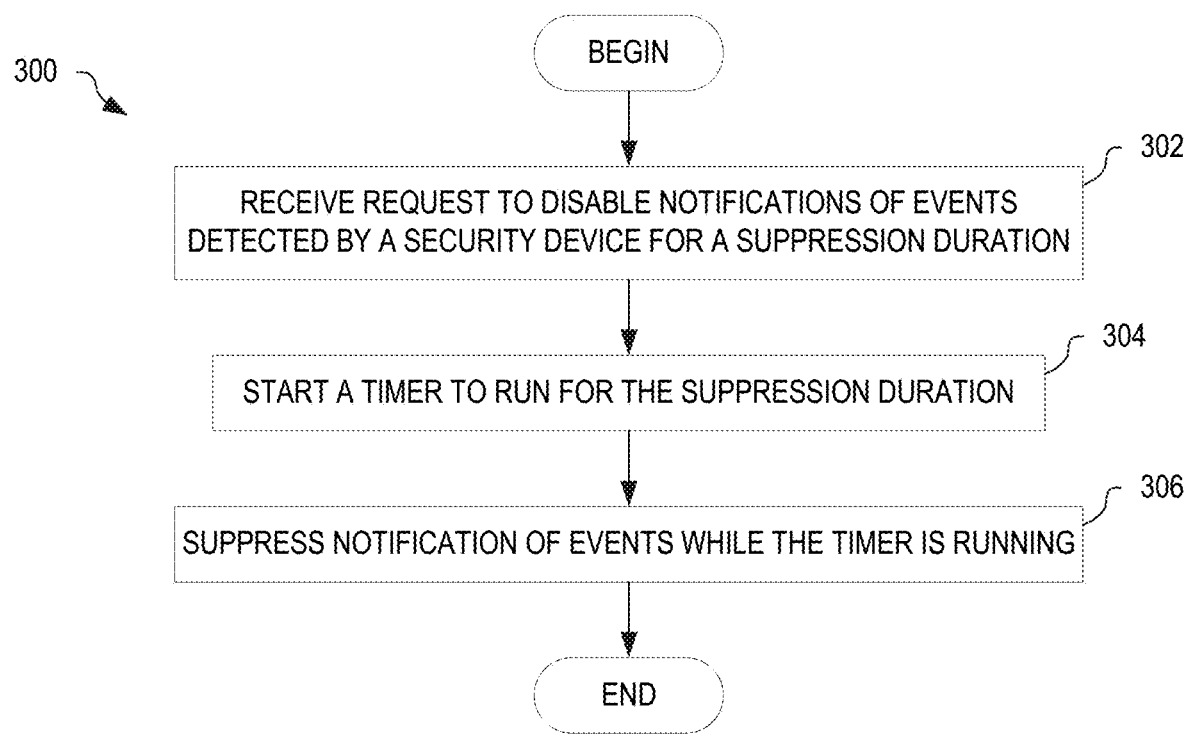
FIG. 3 is a flowchart illustrating one example method for temporary suppression of security event notifications, in an embodiment.

FIG. 3 is a flowchart illustrating one example method 300 for temporary suppression of security event notifications. The method 300 may be implemented within the notification generator 110 of the network-connected device 102 of FIG. 1, for example.

In block 302, the method 300 receives a request to disable notifications of events detected by a security device for a suppression duration. In one example of block 302, the network-connected device 102 receives the suppression request 146 from the client device 140 when the user 142 interacts with the client device 140 and activates the suppress button 144. In block 304, the method 300 starts a timer to run for the suppression duration. In one example of block 304, the notification suppressor 112 starts the timer 114 to run for the suppression duration 148. In block 306, the method 300 suppresses notification of events while the timer is running. In one example of block 306, the notification suppressor 112 evaluates the timer 114 when the event message 132 is received and suppresses generating and sending of the notification 134 when the timer 114 is running.

Figure 4:
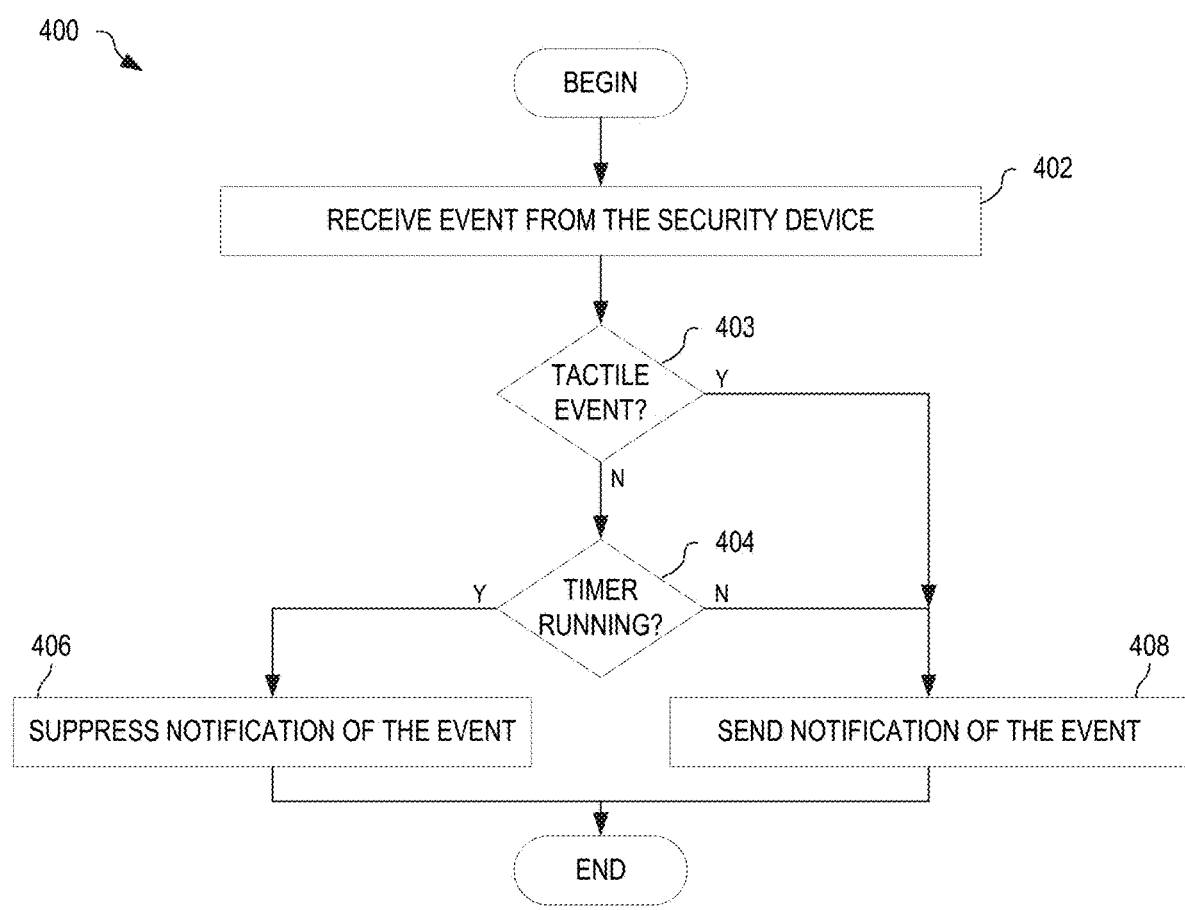
FIG. 4 is a flowchart illustrating one example method for determining whether to suppress notification of an event, in an embodiment.

FIG. 4 is a flowchart illustrating one example method 400 for temporary suppression of security event notifications, illustrating operation of the notification suppressor 112 when the event message 132 is received from the security device 130(1). The method 400 may be, for example, implemented at least in part within the notification generator 110 and at least in part within the notification suppressor 112, and may represent the functionality of block 306 of the method 300 of FIG. 3.

In block 402, the method 400 receives an event from the security device. In one example of block 402, the notification generator 110 receives the event message 132 from the security device 130(1).

In certain embodiments, the method 400 may include block 403, which is a decision. If, in block 403, the method 400 determines that the received event resulted from a tactile trigger, the method 400 continues with block 408; otherwise, the method continues with block 404. A tactile event is received when a visitor presses a button on the security device 130 when it is a video doorbell (see the embodiment of FIG. 18), for example, as opposed to a non-tactile event, such as when the security device 130 detects motion within the environment 150.

Block 404 is a decision. If, in block 404, the method 400 determines that the timer 114 corresponding to the security device 130(1) is running, the method 400 continues with block 406; otherwise the method 400 continues with the block 408.

In block 406, the method 400 suppresses notification of the event. In one example of block 406, the notification suppressor 112 does not generate the notification 134 and does not send the notification 134 to the client device 140. The method 400 then terminates, returning control to block 306 of the method 300.

In block 408, the method sends the notification of the event. In one example of block 408, the notification generator 110 generates the notification 134 based upon the event message 132, and sends the notification 134 to the client device 140. The method 400 then terminates, returning control to block 306 of the method 300.

Suppressing Event Detection

Figure 5:
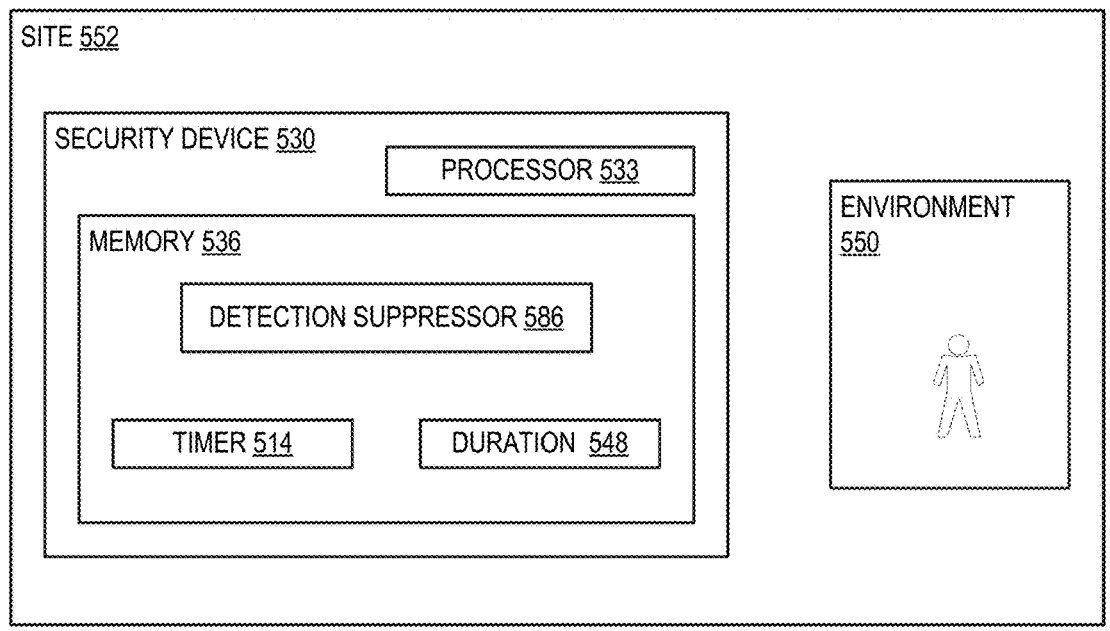
FIG. 5 is a functional block diagram illustrating one example system for temporary suppression of security event notifications within a security device, in an embodiment.
Figure 5:
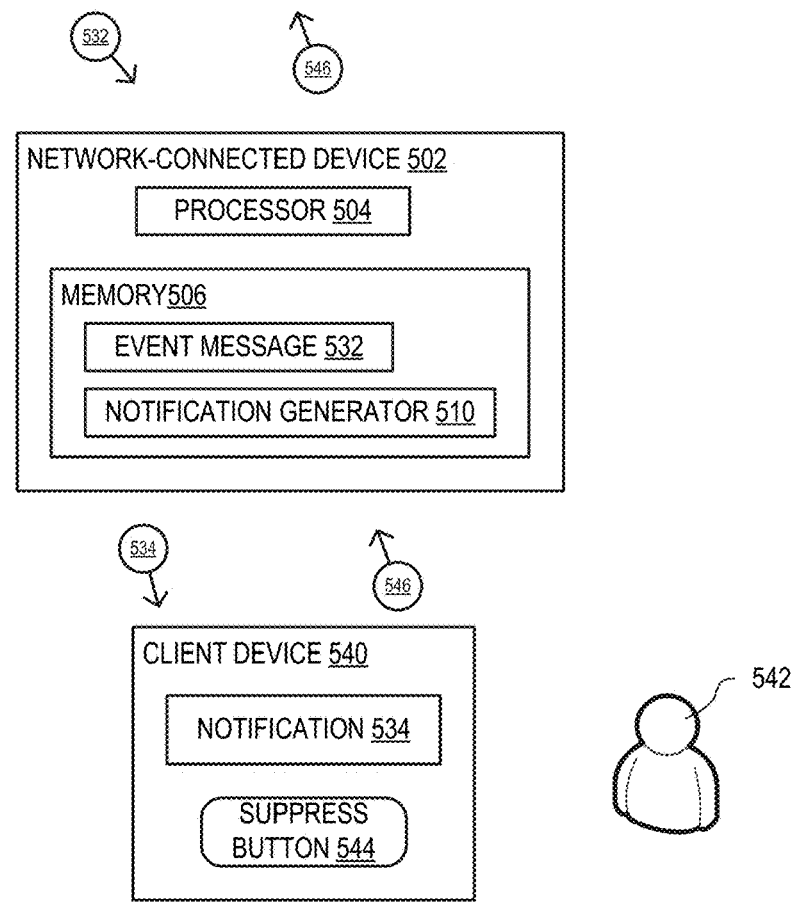

FIG. 5 is a functional block diagram illustrating one example system 500 for suppressing detection of security events. The system 500 is similar to the system 100 of FIG. 1, and includes a network-connected device 502 that is communicatively coupled with a security device 530 located at a site 552, and with a client device 540. The network-connected device 502 may be, for example, a cloud server, a smart-home hub, or a premises security hub, co-located at the site 552 with the security device 530, or another similar device. The site 552 may be a residence, an office, a property, and so on. The site 552 may have more security devices 530 without departing from the scope of the embodiments herein. The network-connected device 502 is a computer that has a processor 504 communicatively coupled with a memory 506.

In the example of FIG. 5, the security device 530 is configured to detect events (e.g., motion, sounds, and so on) within an environment 550 at the site 552 and to send an event message 532 indicative of the event to the network-connected device 502. The network-connected device 502 includes a notification generator 510 that has machine readable instructions stored within the memory 506 that, when executed by the processor 504, control the processor 504 to generate and send a notification 534 to the client device 540 corresponding to the security device 530 in response to receiving the event message 532. For example, a database or data structure may define relationships between one or more security devices 530 and one or more client devices 540, indicating which client device 540 is to receive notifications of events received from each of the security devices 530. The client device 540 may automatically display the notification 534 to the user 542, such that the user 542 becomes aware of the event detected by the security device 530 within the monitored environment 550.

The user 542 of the client device 540 may activate a suppress button 544 of the client device 540 to indicate that notifications 534 corresponding to the security device 530 are to be suppressed for a suppression duration 548, wherein the client device 540 sends a suppression request 546 to the notification generator 510. The suppression request 546 may identify the one or more security devices 530 for which notifications 534 are to be suppressed, and define a suppression duration 548 that defines the period for which the notifications 534 are to be suppressed.

In the embodiment of FIG. 5, the network connected device 502 sends the suppression request 546 to the corresponding security device 530, wherein the security device 530 suppresses detections of events for the suppression duration 548. The security device 530 includes a detection suppressor 586, implemented as machine readable instructions that, when executed by the processor 533, control the processor 533 to receive the suppression request 546 and suppress detection of events by the security device 530 for the suppression duration 548.

In response to receiving the suppression request 546, the detection suppressor 586 starts a timer 514, illustratively shown in the memory 536, to run for the suppression duration 548. For example, where the suppression duration 548 is five minutes, the detection suppressor 586 starts the timer 514 to run for five minutes from receipt of the suppression request 546. In certain embodiments, as shown in FIG. 2, the suppression request 546 may indicate the suppression duration 548 as specified by the user 542. In other embodiments, the suppression duration 548 is predefined. In certain embodiments, such as where the processor 533 is a microcontroller, the timer 514 may be implemented within the processor 533. Advantageously, while the timer 514 is running, the security device 530 does not detect events within the environment 550 and may enter a power saving mode (e.g., a sleep mode as known in the art) until the timer 514 expires, when normal operation (e.g., detection of events within the environment 550) of the security device 530 resumes.

Detection of the Client Device by the Security Device

Figure 6:
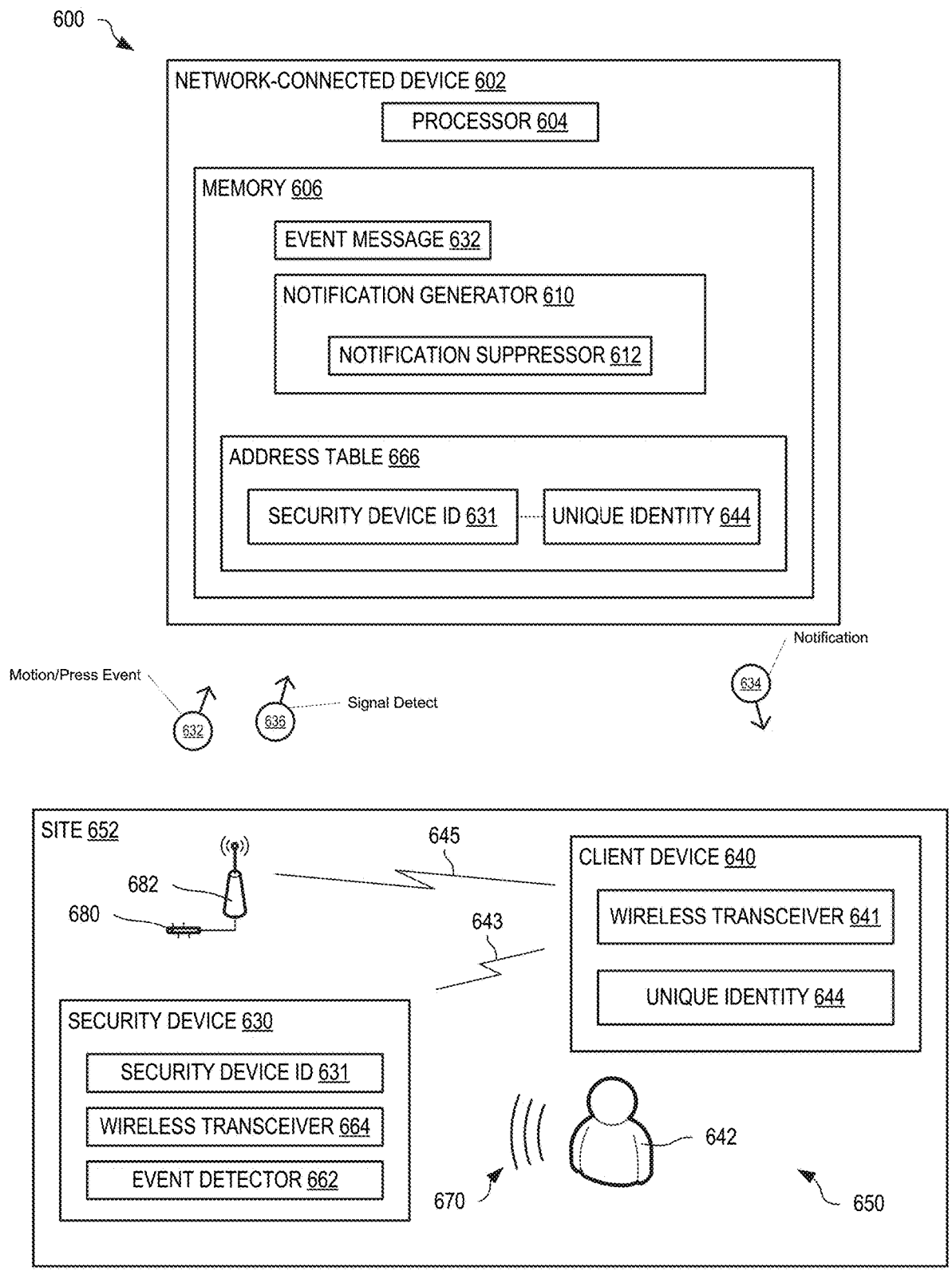
FIG. 6 is a functional block diagram illustrating one example system for automatically suppressing security event notifications, in an embodiment.

FIG. 6 is a functional block diagram illustrating one example system 600 for automatic suppression of security event notifications. The system 600 is similar to the system 100 of FIG. 1, but further operates to inhibit notifications of events detected by a security device when a client device is nearby. Advantageously, by suppressing notification to the client device when the client device is nearby (e.g., at the location of, within a predefined distance of, or within a wireless range of) the security device, the client device does not receive unnecessary notifications when a user of the client device is detected by the security device.

The system 600 includes a network-connected device 602 that is communicatively coupled with a security device 630 located at a site 652 and a client device 640. The network-connected device 602 may be, for example, a cloud server, a smart-home hub, or a premises security hub, co-located at the site 652 with the security device 630, or another similar device. The site 652 may be a residence, an office, a property, and so on. The network-connected device 602 is a computer that has a processor 604 communicatively coupled with a memory 606. In the example of FIG. 6, the security device 630 is configured with an event detector 662 that detects events (e.g., motion, sounds, etc.) within an environment 650 at the site 652. The security device 630 sends an event message 632 to the network-connected device 602 indicative of the detected event. The security device 630 may also capture live video of the environment 650 and the detected event, and stream the live video to the network-connected device 602. The site 652 may have more security devices 630 without departing from the scope of the embodiments herein.

The network-connected device 602 includes a notification generator 610 that has machine readable instructions stored within the memory 606 that, when executed by the processor 604, control the processor 604 to respond to the event message 632 received from the security device 630. For example, upon receiving the event message 632 from the security device 630, the notification generator 610 generates and sends a notification 634 to the client device 640. Where the network-connected device 602 communicates with multiple security devices 630 configured at multiple sites 652, the network-connected device 602 may use a database defining associations between the security devices 630 and the client devices 640 to determine one or more corresponding client devices 640 to receive the notification 634. The client device 640 may automatically display the notification 634 to the user 642, such that the user 642 learns of the activity within the monitored environment 650.

However, as noted above, when the user 642 is within the monitored environment 650 and is detected by the security device 630, the user 642 may consider display of the notification 634 on the client device to be a nuisance. For example, where the site 652 is a residence where the user 642 lives and the security device 630 is positioned at a front door of the residence, the security device 630 detects the user 642 entering or leaving the residence via that door. One aspect of the of the present embodiments includes the realization that the user 642 doesn't need to receive notifications 634 each time he or she enters or leaves his or her own residence. The present embodiments solve this problem by detecting when the user 642 is nearby (e.g., located near to) the security device 630 and is therefore the likely cause of the event detected by the security device 630.

In one embodiment, the security device 630 includes a wireless transceiver 664 that is configured to receive a short range wireless signal 643 transmitted by a wireless transceiver 641 of the client device 640. For example, where the client device 640 is a smartphone or similar device, the wireless transceiver 641 may implement Bluetooth, or another short-range wireless protocol, that uses a relatively low-powered wireless signal as compared to a cellular wireless signal that may also be used by the device. The client device 640 may have a unique identity 644 (e.g., a MAC (media access control) address, a serial number, etc.) that uniquely identifies the client device 640 and is transmitted within the wireless signal 643. Upon receiving the wireless signal 643, the security device 630 may capture the unique identity 644 of the client device 640. In one embodiment, when the security device 630 receives the wireless signal 643, the security device 630 may send a signal detected message 636, including the unique identity 644, to the network-connected device 602. In another embodiment, the security device 630 activates the wireless transceiver 664 to receive the wireless signal 643 when the event detector 662 detects the event within the environment 650. Accordingly, when the wireless signal 643 is received, the security device 630 includes the unique identity 644 within the event message 632 before sending it to the network-connected device 602. When the wireless signal 643 is not received, the security device 630 may determine that the event was caused by someone or something other than the user 642, and is therefore not automatically suppressed.

In one embodiment, the security device 630 communicatively connects with a network 680 local to the site 652 that has a wireless hub 682 that provides wireless connectivity (e.g., Wi-Fi, a home automation hub, a premises security hub, and so on) to the network 680. The security device 630 may connect to the network 680 via the wireless hub 682 for example, or via a wired connection. The security device 630 may interact with the network 680 to determine whether the client device 640, based upon the unique identity 644, is directly (as opposed to connected via the Internet or a cellular network) connected to the network 680 (e.g., via a wireless signal 645 and the wireless hub 682), and thereby determine whether the client device 640 is nearby the security device 630. For example, the wireless hub 682 may have a relatively short wireless range, as compared to cellular connectivity of the client device 640, thereby enabling the security device 630 and/or the wireless hub 682 to determine, when the wireless signal 645 is received, that the client device 640 is near to the wireless hub 682, and thus also nearby the security device 630. Accordingly, the security device 630 may send the signal detected message 636, including the unique identity 644 retrieved from the wireless hub 682, for example, to the network-connected device 602 when the client device 640 is directly connected to the network 680.

The network-connected device 602 may include an address table 666, stored within the memory 606, that associates the security device 630 with the client device 640 based upon a security device ID 631 and the unique identity 644. Each security device 630 may be associated with more than one client device 640, and each client device 640 may be associated with more than one security device 630. When the network-connected device 602 receives the event message 632, the notification generator 610 determines, based upon the address table 666, that the client device 640 is associated with the security device 630. The notification generator 610 invokes the notification suppressor 612 to determine whether the client device 640 is nearby the security device 630 based upon whether the unique identity 644 of the client device 640 is received within the event message 632 and/or the signal detected message 636. Where the notification suppressor 612 determines that the client device 640 is nearby the security device 630, the notification suppressor 612 automatically suppresses sending the notification 634 to the client device 640. Where the client device 640 is not nearby the security device 630, such as when a received unique identifier does not match the unique identity 644 of the client device 640 or when the signal detected message 636 is not received, the notification 634 is not suppressed and the notification generator 610 sends the notification 634 to the client device 640.

In one embodiment, the wireless transceiver 664 is configured to measure a signal strength of the received wireless signal 643. By measuring the signal strength of the wireless signal 643 over time, the security device 630 may determine that the client device 640 is approaching the security device 630 when the signal strength is increasing. The security device 630 may include, within the event message 632, an indication of whether the client device 640 is approaching the security device 630. Accordingly, the notification suppressor 612 may suppress the notification 634 when the client device 640 is approaching the security device 630, and not suppress the notification 634 when the client device 640 is not approaching the security device 630. For example, when the user 642 is already at the site 652, such as within the dwelling at the site 652, the notifications 634 may not be suppressed.

Similarly, the wireless hub 682 may measure a signal strength of the wireless signal 645, wherein the security device 630 may determine whether the client device 640 is approaching the wireless hub 682 (and thus the security device 630), and include the indication of whether the client device 640 is approaching the wireless hub 682 within the event message 632. Accordingly, the notification suppressor 612 may suppress the notification 634 when the client device 640 is approaching the wireless hub 682, and not suppress the notification 634 when the client device 640 is not approaching the wireless hub 682.

The security device 630 may stream live video to the network-connected device 602, even when the notification 634 to the client device 640 is suppressed. Accordingly, the user 642 may still use the client device 640 for later viewing of the video.

In certain embodiments, a corresponding portion of the address table 666 may be stored within the security device 630. For example, the security device 630 may be configured with the unique identity 644 of the corresponding client device 640, thereby enabling the security device 630 to identify the client device 640 when the wireless signal 643 is received. Where the security device 630 receives the wireless signal 643 containing the unique identity 644, the security device 630 may send the signal detected message 636 indicating that the client device 640 is nearby. When the security device 630 receives a wireless signal from a different client device, the security device 630 does not receive the unique identity 644 and does not send the signal detected message 636 to the network-connected device 602. Accordingly, the network-connected device 602 need not evaluate the unique identity 644.

Advanced Notification Configuration

Figure 7:
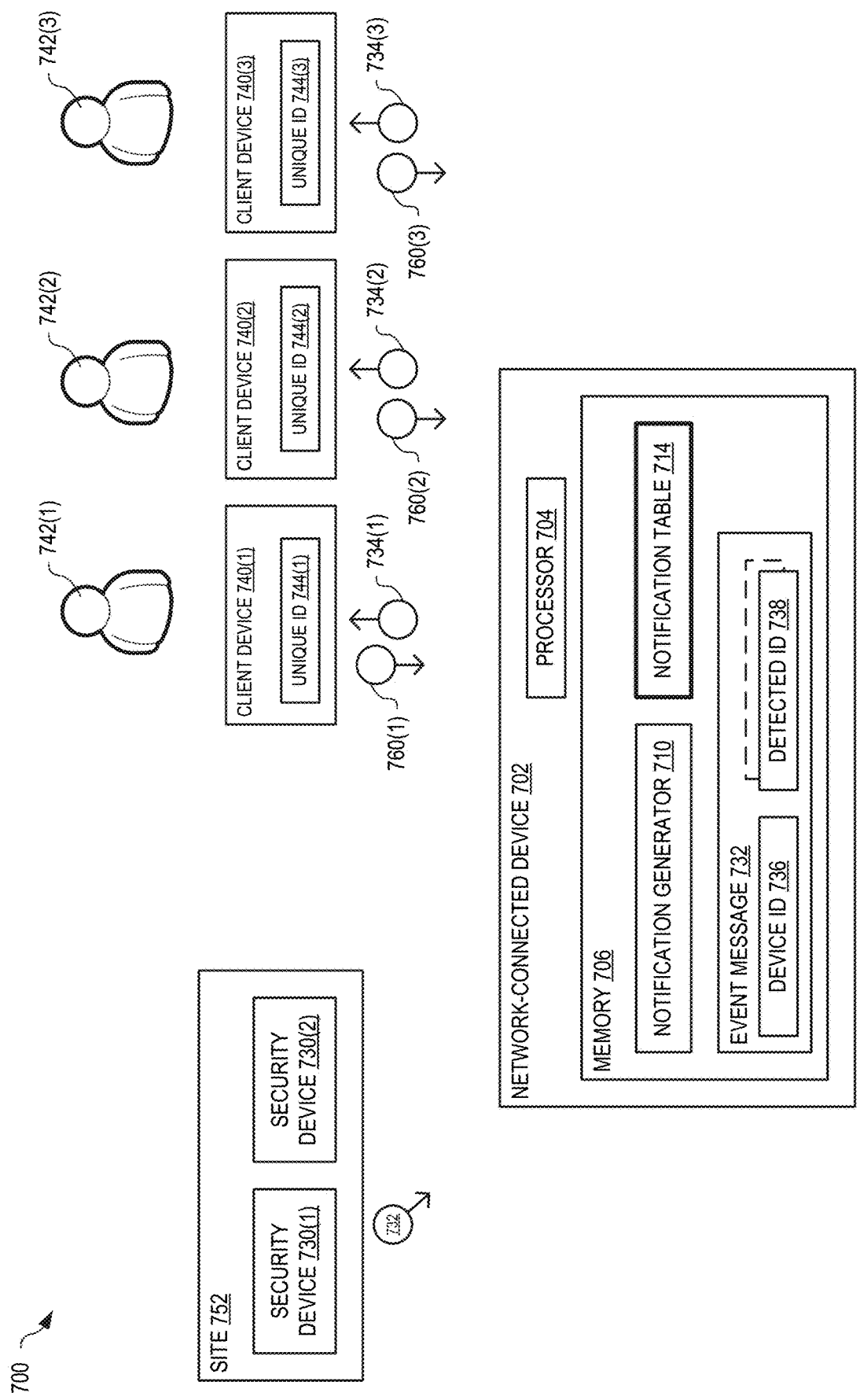
FIG. 7 is a functional block diagram illustrating one example system for automatically suppressing security event notifications from a network-connected device, in an embodiment.

FIG. 7 shows one example scenario 700 where a site 752 is configured with two security devices 730(1)-(2). The site 752 may be, for example, a residence where three people reside, and that are configured, at a network-connected device 702, as users 742(1)-(3) of the security devices 730(1)-(2), where each user 742(1)-(3) has a corresponding client device 740(1)-(3), respectively.

In the example of FIG. 7, the security device 730(1) detects an event and sends an event message 732 to the network-connected device 702. The event message 732 has a device ID 736 that identifies the detecting security device (e.g., the security device 730(1)) and a detected ID 738 that identifies the unique identity 744 for each client device 740, if any, that is detected at the site 752, as described in the embodiment of FIG. 6. In response to the event message 732, a notification generator 710 of the network-connected device 702 sends notifications 734 indicative of the detected event to the client devices 740(1)-(3) based upon a notification table 714.

FIG. 8 shows the notification table 714 of FIG. 7 corresponding to associated security devices 730 and client devices 740 of the site 752. The notification table 714 may contain further information corresponding to other sites, security devices, and client devices that are managed by the network-connected device 702, wherein the security device ID 736 received within the event message 732 is used to identify the corresponding client devices 740. The notification table 714 lists, to the left of the first column, the unique identities 744(1)-(3) of the client devices 740(1)-(3) detected nearby the security device 730 ("DETECTED DEVICE") and, above the first row, the unique identities 744(1)-(3) of the client devices 740(1)-(3) that are to receive a notification ("NOTIFIED DEVICE") when each of the DETECTED DEVICES 740(1)-(3) is detected nearby the security device 730.

In the example of FIG. 8, the notification table 714 defines that when an event is detected at the site 752 and no client device 740 is nearby, each of the client devices 740(1)-(3) receives a notification of the event (as represented by the "1" in each box across the top row of the notification table 714). The notification table 714 also defines that when an event is detected at the site 752, the notification 734 is not sent to any client device 740 that is nearby (as represented by the empty boxes along the diagonal of the notification table 714). When an event is detected at the site 752 and the client device 740(1) is nearby (e.g., the unique identity 744(1) is received in a wireless signal by one of the security devices 730), the notification table 714 defines that each of the client devices 740(2) and 740(3) receives the respective notification 734(2) or 734(3) of the event. When an event is detected at the site 752 and the client device 740(2) is nearby, the notification table 714 defines that each of the client devices 740(1) and 740(3) receives the respective notification 734(1) or 734(3) of the event. When an event is detected at the site 752 and the client device 740(3) is nearby, the notification table 714 defines that only the client device 740(1) receives the notification 734(1) of the event.

The notification table 714 is configurable by the users 742 such that they receive notifications 734 only when desired. For example, each "1" in the notification table 714 may represent configuration of the notification table 714 in response to a notification suppression request 760 that is received from one or more of the client devices 740. Each of the users 742 may interact with their respective client device 740 to configure the notification table 714. In turn, the client device 740 may transmit a notification suppression request 760 to the network-connected device 702 to configure the flags (e.g., each cell that either is "0" (no notification) or includes an "1" (notification)) in the notification table 714. In some embodiments, each client device 740 may only configure the flags corresponding to itself. In other embodiments, any client device 740 (e.g., the first client device 740(1)) may configure the flags of any other client device 740 associated with the security device 730, including the first client device 740(1). In still further embodiments, one or more of the client devices 740 may have permissions to configure the flags for itself and for other client devices 740 (e.g., "owner" permissions or "administrator" permissions), while one or more others of the client devices 740 may have permissions to configure the flags only for itself (e.g., "user" permissions or "shared user" permissions).

For example, the first user 742(1) may interact with the first client device 740(1), which in turn transmits the first notification suppression request 760(1) to the network-connected device 702. The first notification suppression request 760(1) may indicate to configure a first flag 802 and a second flag 804 (FIG. 8) in the notification table 714. The first flag 802 corresponds to the unique ID 744(2) of the second client device 740(2) of the client devices 740 associated with the security devices 730. The first flag 802, which is set to "1," is set in the notification table 714 in response to the notification suppression request 760(1), and indicates to not suppress notification of the event to the second client device 740(2) when the first device 740(1) is detected near the security device 730 at the time of the event. The second flag 804 corresponds to the unique ID 744(1) of the first client device 740(1) of the client devices 740 associated with the security devices 730. The second flag 804, which is set to "0," is set in the notification table 714 in response to the notification suppression request 760(1), and indicates to suppress notification of the event to the first device 740(1) when the first device 740(1) is detected near the security device 730 at the time of the event. In embodiments, the notification table 714 is set by default to notify all client devices 740 of all events.

As discussed above, one aspect of the present embodiments includes the realization that when a security device is configured to continuously monitor an environment, some notifications of events detected within the monitored environment are not needed and may be a nuisance, such as when events are expected to occur. The present embodiments solve this problem by allowing a user to temporarily disable notification of events detected within the environment for a suppression duration. Advantageously, by suppressing notification of events detected by the security device for a suppression duration, the security device continually monitors the environment and the user is not annoyed by notification of events occurring during the suppression duration. A further advantage is that the user does not have to reactivate the security device after the suppression duration, and therefore the user cannot forget.

Also as discussed above, another aspect of the present embodiments includes the realization that it would be advantageous to have a convenient way to temporarily disable notifications of events detected by a security device for a selectable suppression duration that starts immediately. The present embodiments provide this advantage by providing an application that runs on a client device (e.g., a smartphone or other portable communication device) of the user that allows the user to easily suppress notification of events detected by a security device for a selectable suppression duration that starts immediately. Advantageously, the client device may be carried by the user and accessed to easily suppress notification of events for a selectable suppression duration.

Also as discussed above, another aspect of the of the present embodiments includes the realization that a user doesn't need to receive notifications each time he or she enters or leaves his or her own residence when it is configured with a security device. The present embodiments solve this problem by detecting when the user is nearby (e.g., geographically located near to) the security device and is therefore the likely cause of the event detected by the security device, and automatically disabling notification of events detected by the security device.

Also as discussed above, another aspect of the present embodiments includes the realization that where a security device determines that a user of the security device has been detected, the user and/or other users of the security device may not want to receive a notification of the event. The present embodiments solve this problem by determining whether the user is nearby the security device when the event is detected, and sending a notification of the event to the user and/or other users based upon a configurable table that defines who should, and who should not, be notified.

Suppressing Notifications from a Notification

Figure 9:
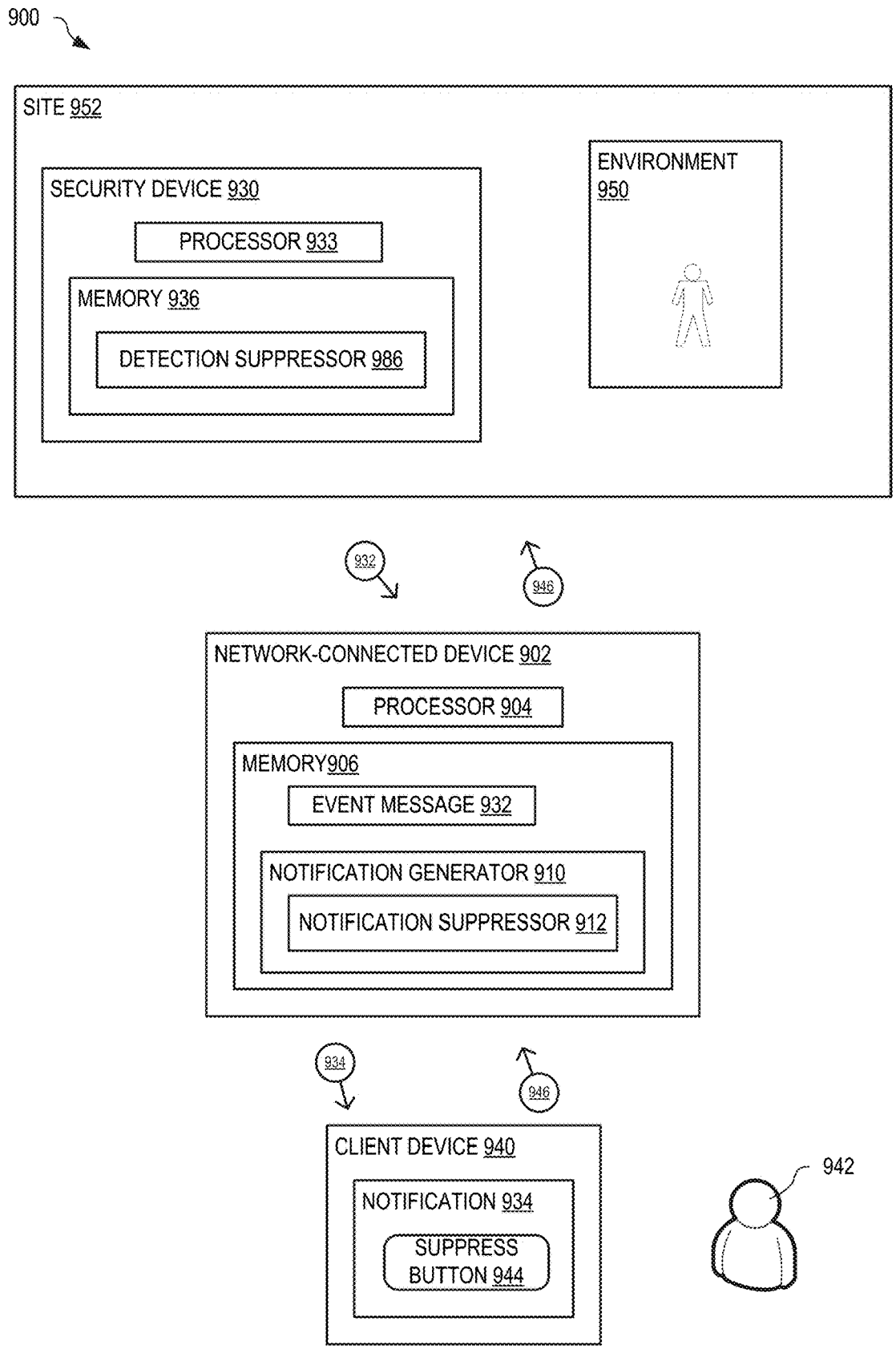
FIG. 9 is a functional block diagram illustrating another example system for temporary suppression of security event notifications, in an embodiment.

FIG. 9 is a functional block diagram illustrating one example system 900 for suppressing notifications of detected security events from a received notification. The system 900 is similar in some respects to the systems 100 of FIG. 1 and 500 of FIG. 5, and includes a network-connected device 902 that is communicatively coupled with (a) a security device 930 located at a site 952 and (b) a client device 940. The network-connected device 902 may be, for example, a cloud server, a smart-home hub, or a premises security hub, co-located at the site 952 with the security device 930, or another similar device. The site 952 may be a residence, an office, a property, and so on. The site 952 may have more security devices 930 without departing from the scope of the embodiments herein. The network-connected device 902 is a computer that has a processor 904 communicatively coupled with a memory 906.

In the example of FIG. 9, the security device 930 is configured to detect events (e.g., motion, sounds, and so on) within an environment 950 at the site 952 and to send an event message 932 indicative of the event to the network-connected device 902. The network-connected device 902 includes a notification generator 910 that has machine readable instructions stored within the memory 906 that, when executed by the processor 904, control the processor 904 to generate and send a notification 934 to the client device 940 corresponding to the security device 930 and in response to receiving the event message 932. In an embodiment, a database or data structure defines relationships between one or more security devices 930 and one or more client devices 940, indicating which client device 940 is to receive notifications of events received from any one of the security devices 930. The client device 940 may automatically display the notification 934 to a user 942 of the client device 940 such that the user 942 becomes aware of the event detected by the security device 930 within the monitored environment 950. In the example of FIG. 9, in response to the event message 932, the notification generator 910 generates the notification 934 with a suppress button 944 that is displayed within the notification 934 at the client device 940.

Figure 10:
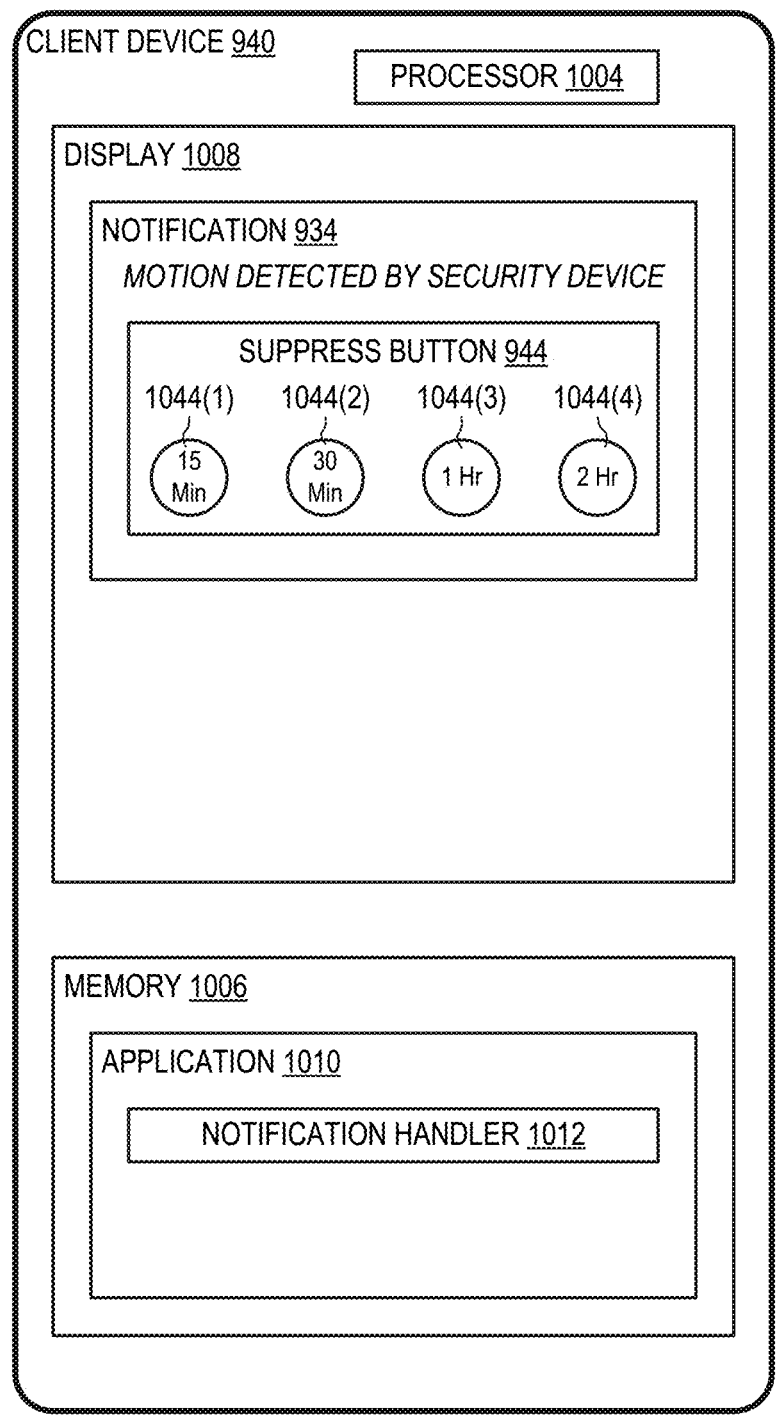
FIG. 10 is a functional block diagram of the client device shown in FIG. 9 configured for interacting with the user to temporarily suppress security event notifications, in an embodiment.

FIG. 10 is a functional block diagram illustrating the client device 940 of FIG. 9 in an example embodiment. The client device 940 may be, for example, a smartphone, a tablet, or another mobile or stationary computing and communication device, that includes a processor 1004 communicatively coupled with a memory 1006 and a display 1008. The client device 940 includes an application 1010 (e.g., an app that is downloaded onto the client device 940) that has machine readable instructions stored within the memory 1006 that are executable by the processor 1004 to interact with a user 942 and the network-connected device 902.

FIGS. 9 and 10 are best viewed together with the following description. In response to the event message 932, the notification generator 910 generates the notification 934 with one or more custom actions that are shown on the display 1008 of client device 940; in this example the custom actions are shown as the suppress button 944 and four selectable duration buttons 1044(1)-(4). These duration buttons 1044(1)-(4) have duration values of fifteen minutes, thirty minutes, one hour, and two hours, respectively. The notification 934 may have a different number of suppress buttons 944 and/or duration buttons 1044, which may be displayed in other ways, without departing from the scope hereof. For example, the notification 934 may show one suppress button 944 that has a default suppression duration of fifteen minutes. In another example, when the user 942 selects the suppress button 944, a further dialog box may open with a plurality of selectable duration buttons 1044.

When any one of the suppress button 944 and the duration buttons 1044(1)-(4) is activated (e.g., tapped on) by the user 942, or when the notification 934 itself is activated (e.g., the user 942 taps on the notification 934 but not on the suppress button 944 or duration buttons 1044(1)-(4)), the notification handler 1012 of the application 1010 is invoked to handle the corresponding custom action. In response to activation of the notification 934 itself, the notification handler 1012 may cause the application 1010 to play a live video feed from the corresponding security device 930 on the display 1008 of the client device 940. In response to activation of the suppress button 944 or one of the duration buttons 1044(1)-(4), the notification handler 1012 generates and sends a suppression request 946 to the network-connected device 902 (e.g., to the notification generator 910). The suppression request 946 may identify the security device(s) 930 for which notifications 934 are to be suppressed, and may define a suppression duration corresponding to the selected duration button 1044(1)-(4). For example, the notification 934 may identify the security device 930 that generated the event message 932; thus the notification handler 1012 may determine the identity of the security device 930 from the notification 934.

In one embodiment, similar to that described above in connection with FIG. 1, the notification generator 910 may invoke a notification suppressor 912 to suppress generation of each notification 934 during the specified suppression duration. In another embodiment, such as described above in connection with FIG. 5, the notification generator 910 sends the suppression request 946 to the corresponding security device 930, wherein that security device 930 suppresses detections of events for the specified suppression duration.

Advantageously, when the notification 934 of an event detected by the security device 930 is received by the client device 940, the user 942 may temporarily suppress further notifications from that security device by activating the suppress button 944, or one of the duration buttons 1044(1)-(4), from within the notification 934, thereby enhancing the user experience by reducing the number of steps needed to temporarily suppress further notifications from the security device.

Figures 11, 12, 13:
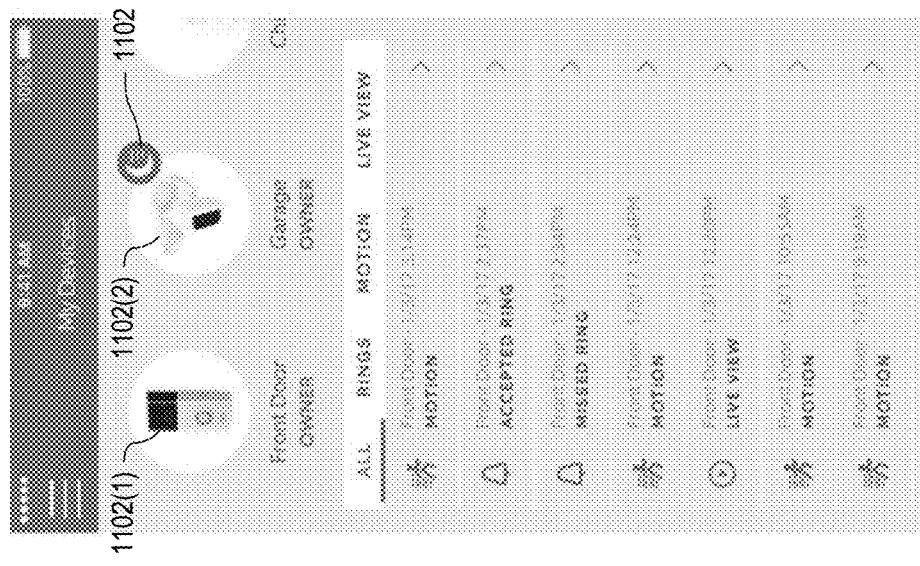
FIGS. 11, 12 and 13 show example screen shots of the user interacting with the application running on the client device of FIGS. 9 and 10, in an embodiment.

FIGS. 11, 12, and 13 show example screen shots of the user 942 interacting with the application 1010 running on the client device 940 of FIGS. 9 and 10. FIGS. 11, 12, and 13 illustrate at least part of the user interface of the application 1010. FIG. 11 shows a home screen 1100 of the application 1010, which includes first and second selectable graphical representations 1102(1) and 1102(2) of the security devices 930 associated with the user 942. A suppress symbol 1102 appears next to the second graphical representation 1102(2), indicating that notifications 934 from the security device 930 corresponding to the second graphical representation 1102(2) are currently being suppressed. When the user 942 selects (e.g., taps on) the second graphical representation 1102(2), a device display 1200 for the corresponding security device 930 is displayed, as shown in FIG. 12. The device display 1200 includes, among other functionality, a motion snooze button 1202, which when selected causes the application 1010 to display a control screen 1300 (FIG. 13) for the corresponding security device 930. The control screen 1300 displays a remaining time 1302 indicative of an amount of time that notifications 934 will be suppressed for the corresponding security device 930, a turn off option 1304 that allows the user to cancel the suppression of notifications 934 for the corresponding security device 930, and a plurality of suppression durations 1306 that each allow the user 942 to select a new suppression duration for the corresponding security device 930. Any selection of the turn off option 1304 or one of the suppression durations 1306 may be initiated when the user 942 selects the save button 1308.

Advantageously, through use of the application 1010, the user 942 may select or adjust temporary notification suppressions for any associated security device 930.

A/V Recording and Communication Device

Figure 14:
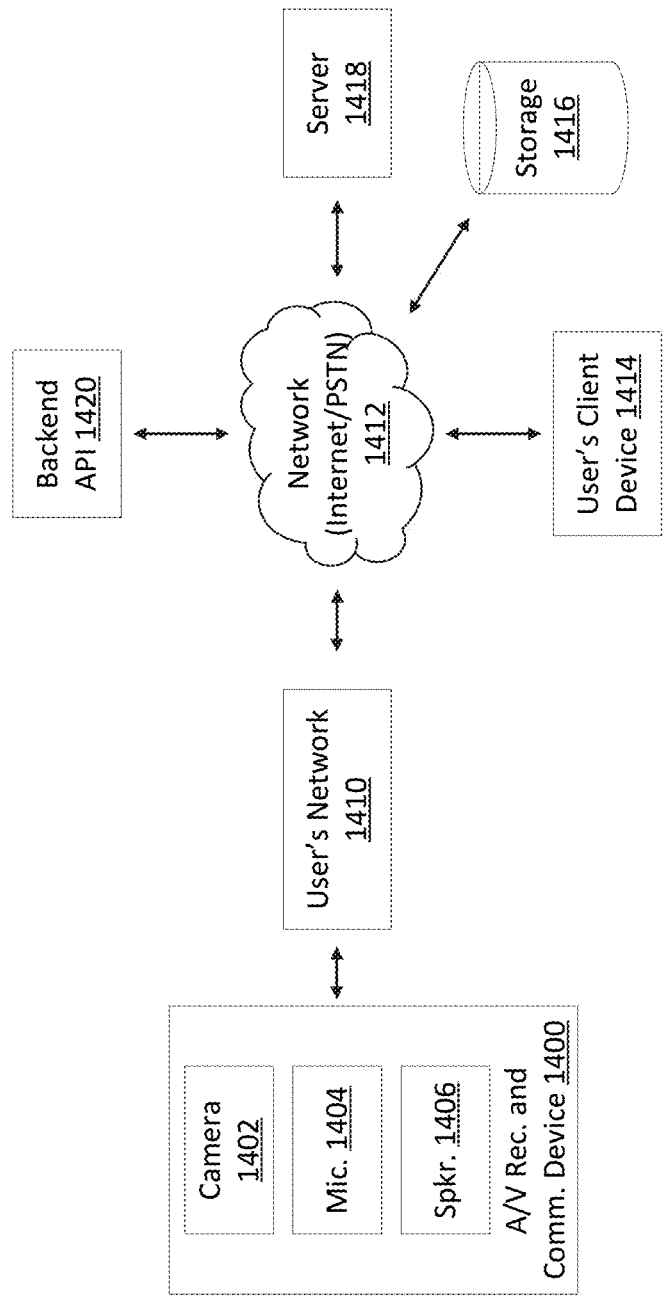
FIG. 14 is a functional block diagram illustrating a system for streaming and storing audio/video (A/V) content captured by a device, according to an embodiment.

With reference to FIG. 14, the present embodiments include an A/V recording and communication device 1400, also known as a security device 1400. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without a front button and related components.

The A/V recording and communication device 1400 may be located near the entrance to a structure (not shown), such as a dwelling, a business, a storage facility, etc. The A/V recording and communication device 1400 includes a camera 1402, a microphone 1404, and a speaker 1406. The camera 1402 may include, for example, a high definition (HD) video camera, such as one configured for capturing video images at an image display resolution of 720p, or 1080p, or better. While not shown, the A/V recording and communication device 1400 may also include other hardware and/or components, such as a housing, a communication module (which may facilitate wired and/or wireless communication with other devices), one or more motion sensors (and/or other types of sensors), a button, etc. The A/V recording and communication device 1400 may further include similar componentry and/or functionality as the wireless communication doorbells described in U.S. Pat. No. 9,584,775 and US Patent Publication Number 2015/0022618, both of which are incorporated by reference in their entireties.

With further reference to FIG. 14, the A/V recording and communication device 1400 communicates with a user's network 1410, which may be for example a wired and/or wireless network. If the user's network 1410 is wireless, or includes a wireless component, the network 1410 may be a Wi-Fi network compatible with the IEEE 802.11 standard and/or other wireless communication standard(s). The user's network 1410 is connected to another network 1412, which may include, for example, the Internet and/or a public switched telephone network (PSTN). As described below, the A/V recording and communication device 1400 may communicate with the user's client device 1414 via the user's network 1410 and the network 1412 (Internet/PSTN). The user's client device 1414 may include, for example, a mobile telephone (may also be referred to as a cellular telephone), such as a smartphone, a personal digital assistant (PDA), or another communication device. The user's client device 1414 includes a display (not shown) and related components configured for displaying streaming and/or recorded video images. The user's client device 1414 may also include a speaker and related components configured for broadcasting streaming and/or recorded audio, and may also include a microphone. The A/V recording and communication device 1400 may also communicate with one or more remote storage device(s) 1416 (may be referred to interchangeably as "cloud storage device(s)"), one or more servers 1418, and/or a backend API (application programming interface) 1420 via the user's network 1410 and the network 1412 (Internet/PSTN). While FIG. 14 illustrates the storage device 1416, the server 1418, and the backend API 1420 as components separate from the network 1412, it is to be understood that the storage device 1416, the server 1418, and/or the backend API 1420 may be considered to be components of the network 1412.

The network 1412 may be any wireless network or any wired network, or a combination thereof, configured to operatively couple the above-mentioned modules, devices, and systems as shown in FIG. 14. For example, the network 1412 may include one or more of the following: a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 1412 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

In certain embodiments, when a person (may be referred to interchangeably as "visitor") arrives at the A/V recording and communication device 1400, the A/V recording and communication device 1400 detects the visitor's presence and begins capturing video images within a field of view of camera 1402. The A/V recording and communication device 1400 may also capture audio through microphone 1404. The A/V recording and communication device 1400 may detect the visitor's presence by detecting motion using the camera 1402 and/or a motion sensor, and/or by detecting that the visitor has pressed a front button of the A/V recording and communication device 1400 (for example, when the A/V recording and communication device 1400 is a doorbell).

In response to the detection of the visitor, the A/V recording and communication device 1400 sends an alert to the user's client device 1414 (FIG. 14) via the user's network 1410 and the network 1412. The A/V recording and communication device 1400 also sends streaming video, and may also send streaming audio, to the user's client device 1414. If the user answers the alert, two-way audio communication may then occur between the visitor and the user through the A/V recording and communication device 1400 and the user's client device 1414. The user may view the visitor throughout the duration of the call, but the visitor cannot see the user (unless the A/V recording and communication device 1400 includes a display, which it may in certain embodiments).

The video images captured by the camera 1402 of the A/V recording and communication device 1400 (and the audio captured by the microphone 1404) may be uploaded to the cloud and recorded on the remote storage device 1416 (FIG. 14). In some embodiments, the video and/or audio may be recorded on the remote storage device 1416 even if the user chooses to ignore the alert sent to the user's client device 1414.

With further reference to FIG. 14, the system may further include a backend API 1420 including one or more components. A backend API (application programming interface) may include, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, include many such applications, each of which communicate with one another using their public APIs. In some embodiments, the API backend may hold the bulk of the user data and offer the user management capabilities, leaving the clients to have very limited state.

The backend API 1420 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 1420 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 15:
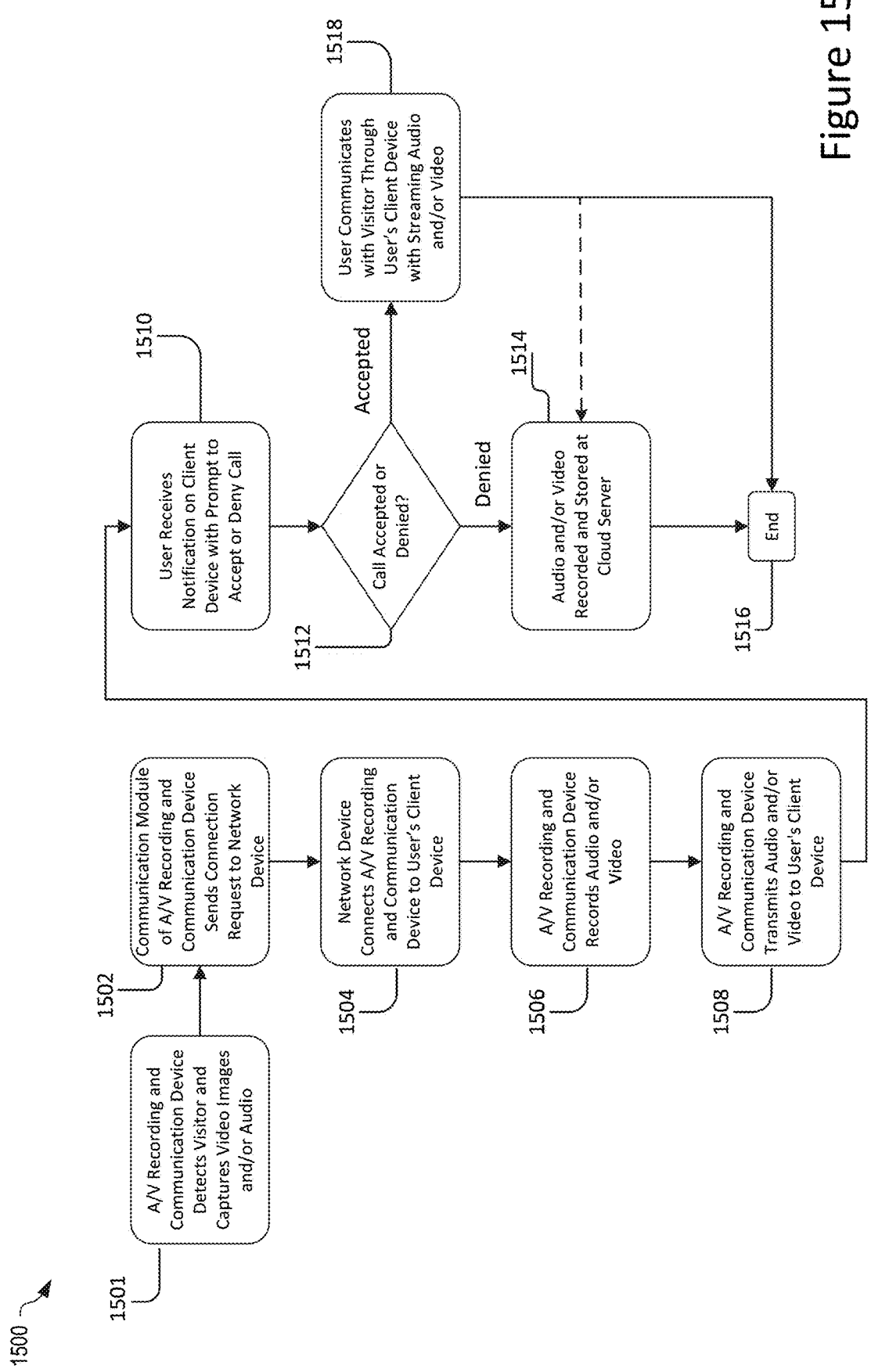
FIG. 15 is a flowchart illustrating a process for streaming and storing A/V content from the device of FIG. 14, according to an embodiment.

FIG. 15 is a flowchart illustrating a process 1500 for streaming and storing A/V content from the A/V recording and communication device 1400, in an embodiment. At block 1501, the A/V recording and communication device 1400 detects the visitor's presence and captures video images within a field of view of the camera 1402. The A/V recording and communication device 1400 may also capture audio through the microphone 1404. As described above, the A/V recording and communication device 1400 may detect the visitor's presence by detecting motion using the camera 1402 and/or a motion sensor, and/or by detecting that the visitor has pressed a front button of the A/V recording and communication device 1400 (for example, when the A/V recording and communication device 1400 is a doorbell). Also as described above, the video recording/capture may begin when the visitor is detected, or may begin earlier, as described below.

At block 1502, a communication module of the A/V recording and communication device 1400 sends a connection request, via the user's network 1410 and the network 1412, to a device in the network 1412. For example, the network device to which the connection request is sent may be a server such as the server 1418. The server 1418 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 1420, which is described above.

In response to the request, at block 1504 the network device may connect the A/V recording and communication device 1400 to the user's client device 1414 through the user's network 1410 and the network 1412. At block 1506, the A/V recording and communication device 1400 may record available audio and/or video data using the camera 1402, the microphone 1404, and/or any other device/sensor available. At block 1508, the audio and/or video data is transmitted (streamed) from the A/V recording and communication device 1400 to the user's client device 1414 via the user's network 1410 and the network 1412. At block 1510, the user may receive a notification on the user's client device 1414 with a prompt to either accept or deny the call.

At block 1512, the process 1500 determines whether the user has accepted or denied the call. If the user denies the notification, then the process 1500 advances to block 1514, where the audio and/or video data is recorded and stored at a cloud server. The session then ends at block 1516 and the connection between the A/V recording and communication device 1400 and the user's client device 1414 is terminated. If, however, the user accepts the notification, the process 1500 proceeds with block 1518 where the user communicates with the visitor through the user's client device 1414 while audio and/or video data captured by the camera 1402, the microphone 1404, and/or other devices/sensors, is streamed to the user's client device 1414. At the end of the call, the user may terminate the connection between the user's client device 1414 and the A/V recording and communication device 1400 and the session ends at block 1516. In some embodiments, the audio and/or video data may be recorded and stored at a cloud server (block 1514) even if the user accepts the notification and communicates with the visitor through the user's client device 1414.

Figure 16:
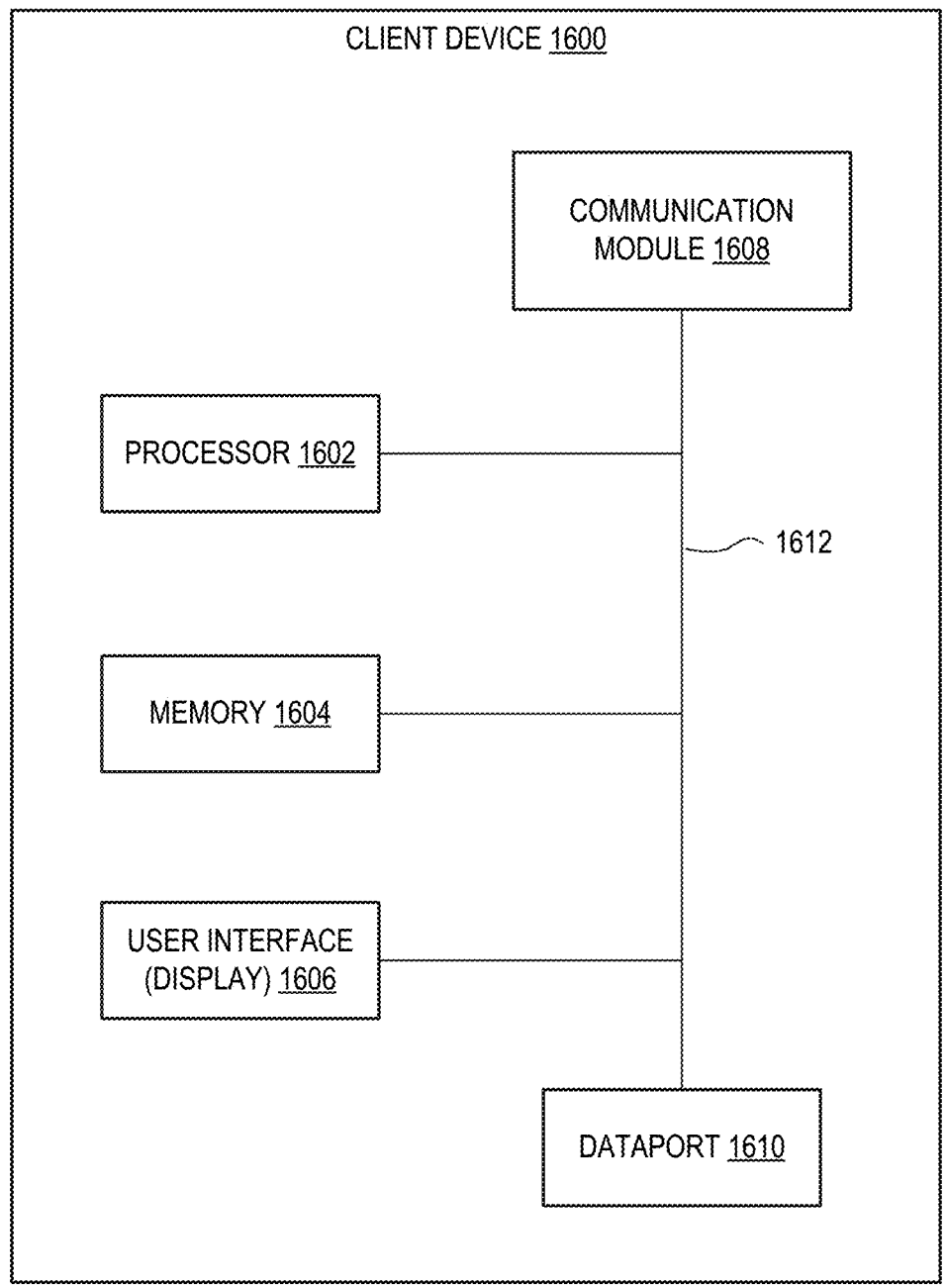
FIG. 16 is a functional block diagram of a client device on which the present embodiments may be implemented according to various aspects of the present disclosure.

FIG. 16 is a functional block diagram of a client device 1600 on which the present embodiments may be implemented according to various aspects of the present disclosure. The user's client device 1414 described with reference to FIG. 14 may include some or all of the components and/or functionality of the client device 1600. The client device 1600 may be, for example, a smartphone.

The client device 1600 includes a processor 1602, a memory 1604, a user interface 1606, a communication module 1608, and a dataport 1610. These components are communicatively coupled together by an interconnect bus 1612. The processor 1602 may include any processor used in smartphones and/or portable computing devices, such as an ARM processor (a processor based on the RISC (reduced instruction set computer) architecture developed by Advanced RISC Machines (ARM).). In certain embodiments, the processor 1602 includes one or more other processors, such as one or more microprocessors, and/or one or more supplementary co-processors, such as math co-processors.

The memory 1604 may include both operating memory, such as random access memory (RAM), as well as data storage, such as read-only memory (ROM), hard drives, flash memory, or any other suitable memory/storage element. The memory 1604 may include removable memory elements, such as a CompactFlash card, a MultiMediaCard (MMC), and/or a Secure Digital (SD) card. In certain embodiments, the memory 1604 includes a combination of magnetic, optical, and/or semiconductor memory, and may include, for example, RAM, ROM, flash drive, and/or a hard disk or drive. The processor 1602 and the memory 1604 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1602 may be connected to the memory 1604 via the dataport 1610.

The user interface 1606 may include any user interface or presentation elements suitable for a smartphone and/or a portable computing device, such as a keypad, a display screen, a touchscreen, a microphone, and a speaker. The communication module 1608 is configured to handle communication links between the client device 1600 and other, external devices or receivers, and to route incoming/outgoing data appropriately. For example, inbound data from the dataport 1610 may be routed through the communication module 1608 before being directed to the processor 1602, and outbound data from the processor 1602 may be routed through the communication module 1608 before being directed to the dataport 1610. The communication module 1608 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1610 may be any type of connector used for physically interfacing with a smartphone and/or a portable computing device, such as a mini-USB port or an IPHONE®/IPOD® 30-pin connector or LIGHTNING® connector. In other embodiments, the dataport 1610 may include multiple communication channels for simultaneous communication with, for example, other processors, servers, and/or client terminals.

The memory 1604 may store instructions for communicating with other systems, such as a computer. The memory 1604 may store, for example, a program (e.g., computer program code) adapted to direct the processor 1602 in accordance with the present embodiments. The instructions also may include program elements, such as an operating system. While execution of sequences of instructions in the program causes the processor 1602 to perform the process steps described herein, hard-wired circuitry may be used in place of, or in combination with, software/firmware instructions for implementation of the processes of the present embodiments. Thus, the present embodiments are not limited to any specific combination of hardware and software.

System/Device

Figure 17:
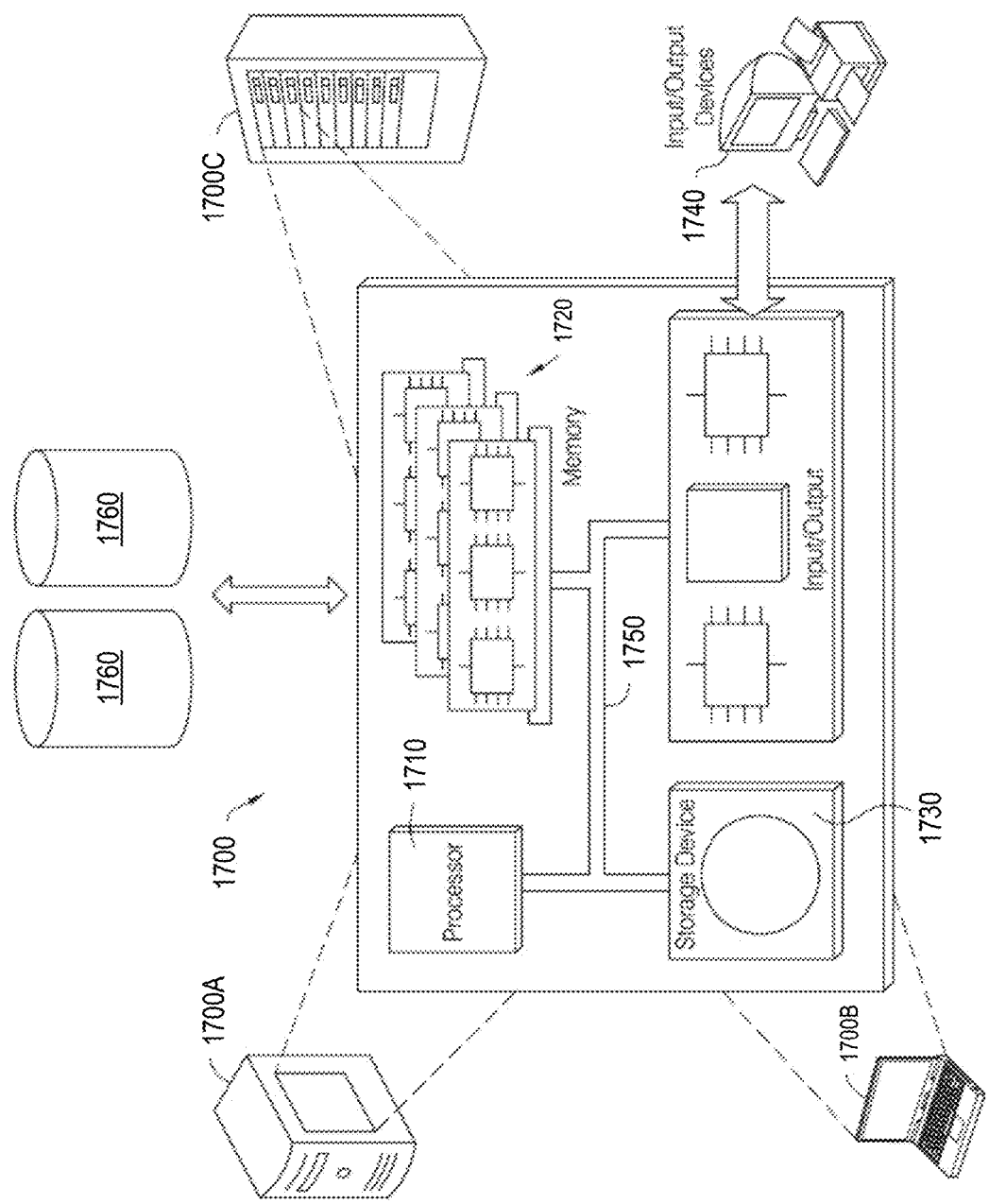
FIG. 17 is a functional block diagram of a system on which the present embodiments may be implemented according to various aspects of present disclosure.

FIG. 17 is a functional block diagram of a system 1700 on which the present embodiments may be implemented according to various aspects of the present disclosure. For example, any one or more of the network-connected device 102 (FIG. 1), the security device 130 (FIG. 1), the client device 140 (FIGS. 1 and 2), the network-connected device 502 (FIG. 5), the security device 530 (FIG. 5), the client device 540 (FIG. 5), the network-connected device 602 (FIG. 6), the client device 640 (FIG. 6), the security device 630 (FIG. 6), the client device 640 (FIG. 6), the network-connected device 702 (FIG. 7), the security devices 730 (FIG. 7), and the client device 740 (FIG. 7) may be implemented on the system 1700. The computer system 1700 may be embodied in at least one of a personal computer (also referred to as a desktop computer) 1700A, a portable computer (also referred to as a laptop or notebook computer) 1700B, and/or a server 1700C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1700 may execute at least some of the operations described above. The computer system 1700 may include at least one processor 1710, a memory 1720, at least one storage device 1730, and input/output (I/O) devices 1740. Some or all of the components 1710, 1720, 1730, 1740 may be interconnected via a system bus 1750. The processor 1710 may be single- or multi-threaded and may have one or more cores. The processor 1710 may execute instructions, such as those stored in the memory 1720 and/or in the storage device 1730. Information may be received and output using one or more of the I/O devices 1740.

The memory 1720 may store information, and may be a computer-readable medium, such as volatile or non-volatile memory. The storage device(s) 1730 may provide storage for the computer system 1700, and may be a computer-readable medium. In various embodiments, the storage device(s) 1730 may be one or more of a flash memory device, a hard disk device, an optical disk device, a tape device, or any other type of storage device.

The I/O devices 1740 may provide input/output operations for the computer system 1700. The I/O devices 1740 may include a keyboard, a pointing device, and/or a microphone. The I/O devices 1740 may further include a display unit for displaying graphical user interfaces, a speaker, and/or a printer. External data may be stored in one or more accessible external databases 1760.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Example Embodiments

Figure 18:
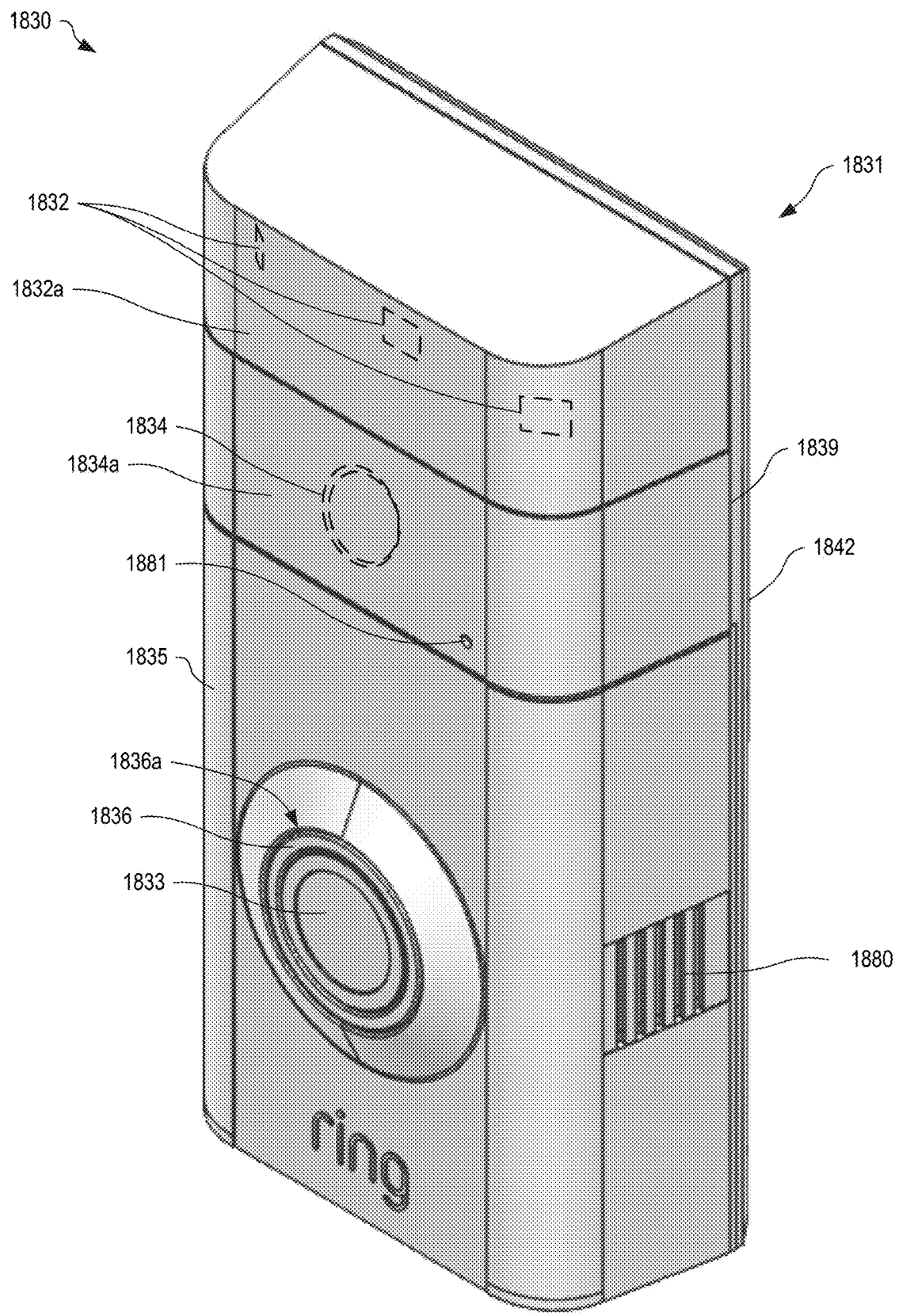
FIG. 18 is a front perspective view of the device of FIG. 14 implemented as a doorbell, in an embodiment.

FIG. 18 is a front perspective view of a doorbell 1830 that represents one example implementation of the security device 1400 of FIG. 14, hereafter referred to as device 1830. The device 1830 has a housing 1831 that includes a backplate 1839, a faceplate 1835 with a button 1833, an optically-transparent lens 1834a positioned in front of a camera 1834, and an infrared-transparent lens 1832a positioned in front of at least one motion sensor 1832. The housing 1831 may be further configured with an aperture 1881 to allow sound to enter the housing 1831 for detection by a microphone. The device 1830 may also include a mounting bracket 1842 that couples with the backplate 1839 to facilitate mounting of the device 1830 on a flat surface, such as the exterior of a building, such as a home or office. For example, the mounting bracket 1842 may be selected for mounting to surfaces of various composition, including, without limitation, wood, concrete, stucco, brick, vinyl siding, aluminum siding, etc., with any suitable fasteners, such as screws, or interference connections, adhesives, etc. The device 1830 may couple to the mounting bracket 1842 using any suitable fasteners, such as screws, or interference connections, mating hooks and apertures, adhesives, etc. The backplate 1839 may include screw terminals configured to receive electrical wires adjacent a mounting surface of the device 1830. The device 1830 may receive electrical power through the screw terminals and/or the device 1830 may control electrical connectivity of the screw terminals to cause a conventional doorbell to sound if so connected to the wires.

The faceplate 1835 may extend from the bottom of the device 1830 up to just below the camera 1834. The faceplate 1835 may be formed of any suitable material, including, without limitation, metals, such as brushed aluminum or stainless steel, metal alloys, and plastics, and any combination thereof. The faceplate 1835 protects the internal contents of the device 1830 and serves as an exterior front surface of the device 1830. The faceplate 1835 may include an aperture 1836a with a flexible translucent membrane 1836 for movably holding the button 1833. The faceplate 1835 is also formed with at least one speaker grille 1880 to allow sound generated within the housing 1831 to exit. The button 1833 and the flexible translucent membrane 1836 may have various profiles that may or may not match the profile of the faceplate 1835. The flexible translucent membrane 1836 may include any suitable material, including, without limitation, a transparent silicone, plastic, or rubber, that is configured for allowing light produced within the device 1830 to pass through and is sufficiently flexible to allow the button 1833 to be pressed. The light may be produced by one or more light-emitting components, such as light-emitting diodes (LEDs), contained within the device 1830, as further described below. The button 1833 and/or the flexible translucent membrane 1836 contacts a switch cover located within the device 1830 when the button 1833 is pressed by a visitor. When pressed, the button 1833 may trigger one or more functions of the device 1830, as further described below.

The motion sensor 1832 may be, for example, one or more passive infrared (PIR) sensors that detect motion using the infrared wavelength, but may be any type of sensor configured for detecting and communicating the presence of motion and/or a heat source within their field of view. The motion sensor 1832 may be configured to detect motion using any methodology, including but not limited to methodologies that do not rely on detecting the presence of a heat source within a field of view, without departing from the scope of the present embodiments. In certain embodiments, the infrared-transparent lens 1832a may be a Fresnel lens patterned to focus incoming light onto the at least one motion sensor 1832 located within the device 1830. The infrared transparent lens 1832a may be substantially coplanar with a front surface of the housing 1831. In alternative embodiments, the infrared-transparent lens 1832a may be recessed within the housing 1831 or may protrude outward from the housing 1831. The infrared-transparent lens 1832a may extend and curl partially around the side of the device 1830 without departing from the scope of the present embodiments. The at least one motion sensor 1832 is configured to sense a presence and/or motion of an object in front of the device 1830. In certain embodiments, the optically-transparent lens 1834a may be configured for focusing light into the camera 1834 so that clear images may be taken. The camera 1834 is configured for capturing video data when activated.

Floodlight Embodiment

Figure 19:
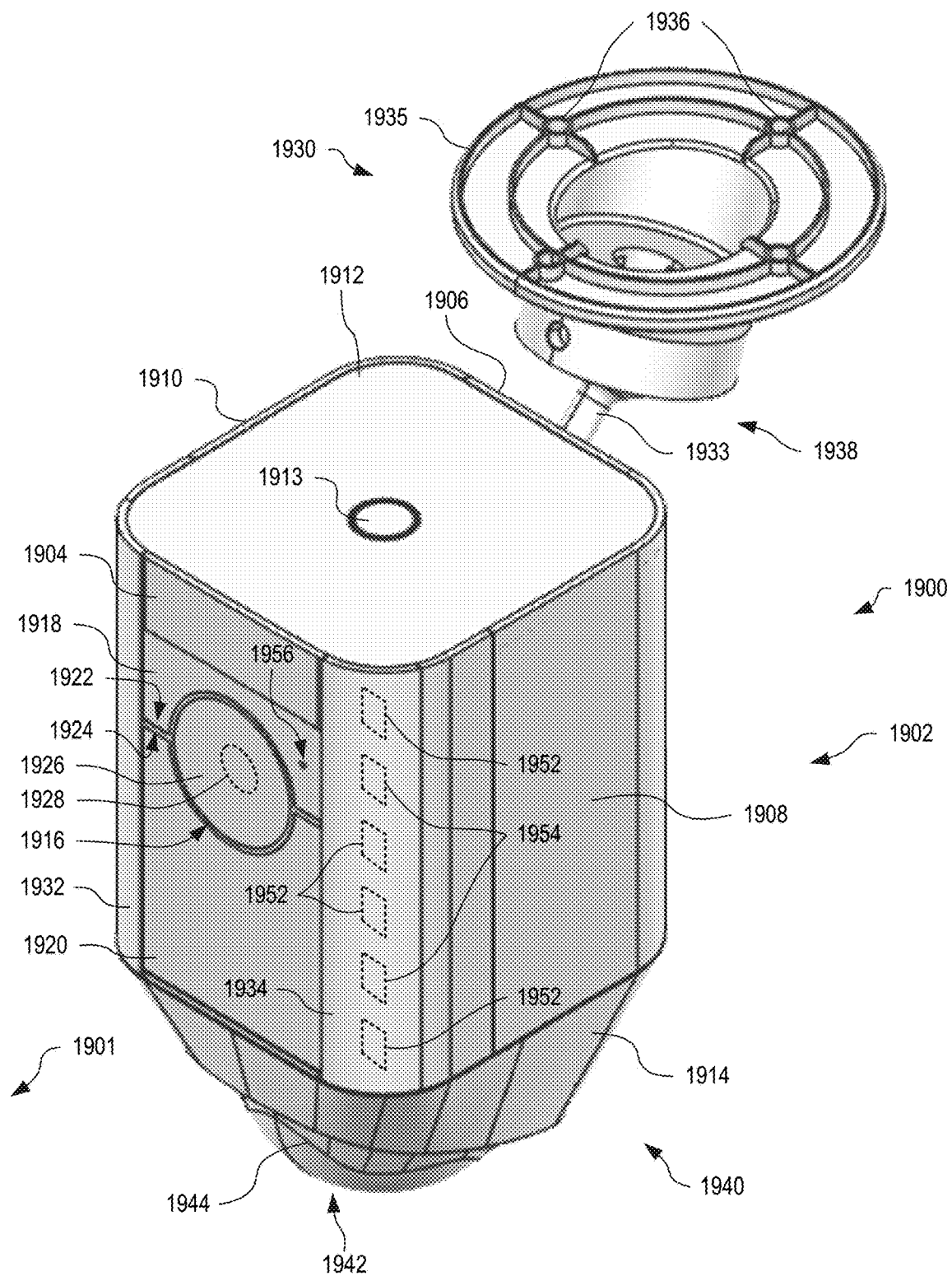
FIG. 19 is a front perspective view of the device of FIG. 14 implemented as a security/floodlight controlling device, in an embodiment, in combination with mounting hardware.

FIG. 19 is a front perspective view of a security device 1900, that represents one example implementation of the security device 1400 of FIG. 14.

The security device 1900 is configured with a housing 1902 for containing and protecting the interior components of the security device 1900. The housing 1902 includes a front wall 1904, a rear wall 1906, opposing sidewalls 1908 (right), 1910 (left), an upper wall 1912, and a tapered lower portion 1914. The front wall 1904 forms a central opening 1916 that receives an upper shield 1918 and a lower grille 1920. In the illustrated embodiment, front surfaces of the upper shield 1918 and the lower grille 1920 are substantially flush with a front surface of the front wall 1904, but in alternative embodiments, these surfaces may not be flush with one another. The upper shield 1918 is substantially rectangular with a semicircular indentation along its lower edge 1922. The lower grille 1920 is substantially rectangular, and includes a semicircular indentation along its upper edge 1924. Together, the semicircular indentations in the upper shield 1918 and the lower grille 1920 form a circular opening that accommodates a cover 1926. The upper shield 1918, the lower grille 1920, and the cover 1926 are described in further detail below.

A camera 1928 is positioned behind the cover 1926 with a field of view of a monitored area 1901 to the front of the security device 1900 through the circular opening formed by the upper shield 1918 and the lower grille 1920. The cover 1926 is preferably transparent or translucent so that it does not interfere with the field of view of the camera 1928. For example, in certain embodiments the cover 1926 may include colorless glass or plastic.

The security device 1900 has a plurality of visible light emitting elements 1952 and infrared light emitting elements 1954 that are positioned behind left and right front corner shields 1932, 1934. For clarity of illustration, the visible light emitting elements 1952 and the infrared light emitting elements 1954 are shown only behind right corner shield 1934; the visible light emitting elements 1952 and the infrared light emitting elements 1954 are similarly positioned behind the left corner shield 1932. The corner shields 1932, 1934 may be formed of a material that is transparent to light within both the visible spectrum and the infrared spectrum. In certain embodiments, the corner shields 1932, 1934 are formed of a clear plastic (e.g., polycarbonate) or glass. The corner shields 1932, 1934, therefore, do not significantly interfere with transmission of light from the visible light emitting elements 1952 and the infrared light emitting elements 1954 into the monitored area 1901. The infrared light emitting elements 1954, in conjunction with operation of the camera 1928, facilitates night vision functionality of the security device 1900.

An input device 1913 is positioned on the upper wall 1912 of the housing 1902 such that it is accessible by the user. The input device 1913 may be, for example, a button connected to an electrical switch that provides an input to a processor of security device 1900.

The security device 1900 includes at least two microphones. The first microphone is positioned at the front of the security device 1900 and is aligned with a first microphone aperture 1956 within the upper shield 1918. The second microphone is positioned at the left side of the security device 1900 and is aligned with a second microphone aperture in the left sidewall 1910 of the housing 1902.

The tapered lower portion 1914 includes an opening to receive a motion sensor cover 1944, which is convexly shaped to cover and close the lower end opening of the tapered lower portion 1914. The motion sensor cover 1944 may include a Fresnel lens 1942 that is configured to focus and concentrate incoming infrared light onto a motion sensor (e.g., PIR sensors, not shown) located within the tapered lower portion 1914, thereby enhancing the effectiveness and/or sensitivity of the motion sensor. In alternative embodiments, the motion sensor cover 1944 may not include a Fresnel lens.

The motion sensor cover 1944 and the tapered lower portion 1914 couple with a plate to form a battery access door 1940 within the housing 1902 that provides access to removable battery casings configured within housing 1902. This configuration is well suited to a typical use case for the security device 1900, since floodlights are typically located above the head level of a person of average height. A person (or other object) moving at ground level within the monitored area 1901 is thus likely to be well within the field of view of the motion sensor.

The security device 1900 configured with coupling hardware 1930 that may be used to attach the security device 1900 to a supporting structure (not shown). For example, the coupling hardware 1930 may be used to secure the security device 1900 to a wall, a ceiling, a frame, a post, a gate, and so on. In the illustrated embodiment, the coupling hardware 1930 has a first connecting member 1933 secured to the rear wall 1906 of the housing 1902 and a second connecting member 1935 configured for securing to the supporting structure. For example, the second connecting member 1935 may include one or more apertures 1936 that allow the second connecting member 1935 to be screwed or nailed to the supporting structure. The first and second connecting members 1933, 1935 meet at a ball-and-socket joint 1938 that allows the first and second connecting members 1933, 1935 to articulate with respect to one another such that the security device 1900 may be oriented as desired. The ball-and-socket joint 1938 is, however, just one non-limiting example. In alternative embodiments, other types of joints may be provided between the first and second connecting members 1933, 1935, including non-articulating joints. In further alternative embodiments, the coupling hardware 1930 may include a single unitary member, rather than the first and second connecting members 1933, 1935.

In certain embodiments, the security device 1900 is configured to control an external illumination source that is capable of being reoriented, the external floodlights may work in conjunction with the integral illumination source (e.g., the visible light emitting elements 1952 and the infrared light emitting elements 1954) to illuminate a broader area around the security device 1900, thereby providing greater security and a larger area for video surveillance and recording. For example, the user may orient the security device 1900 such that the integral illumination source points straight ahead and reorient the external illumination source to point to the sides of the area illuminated by the integral illumination source, thereby illuminating a broader area.

Figure 20:
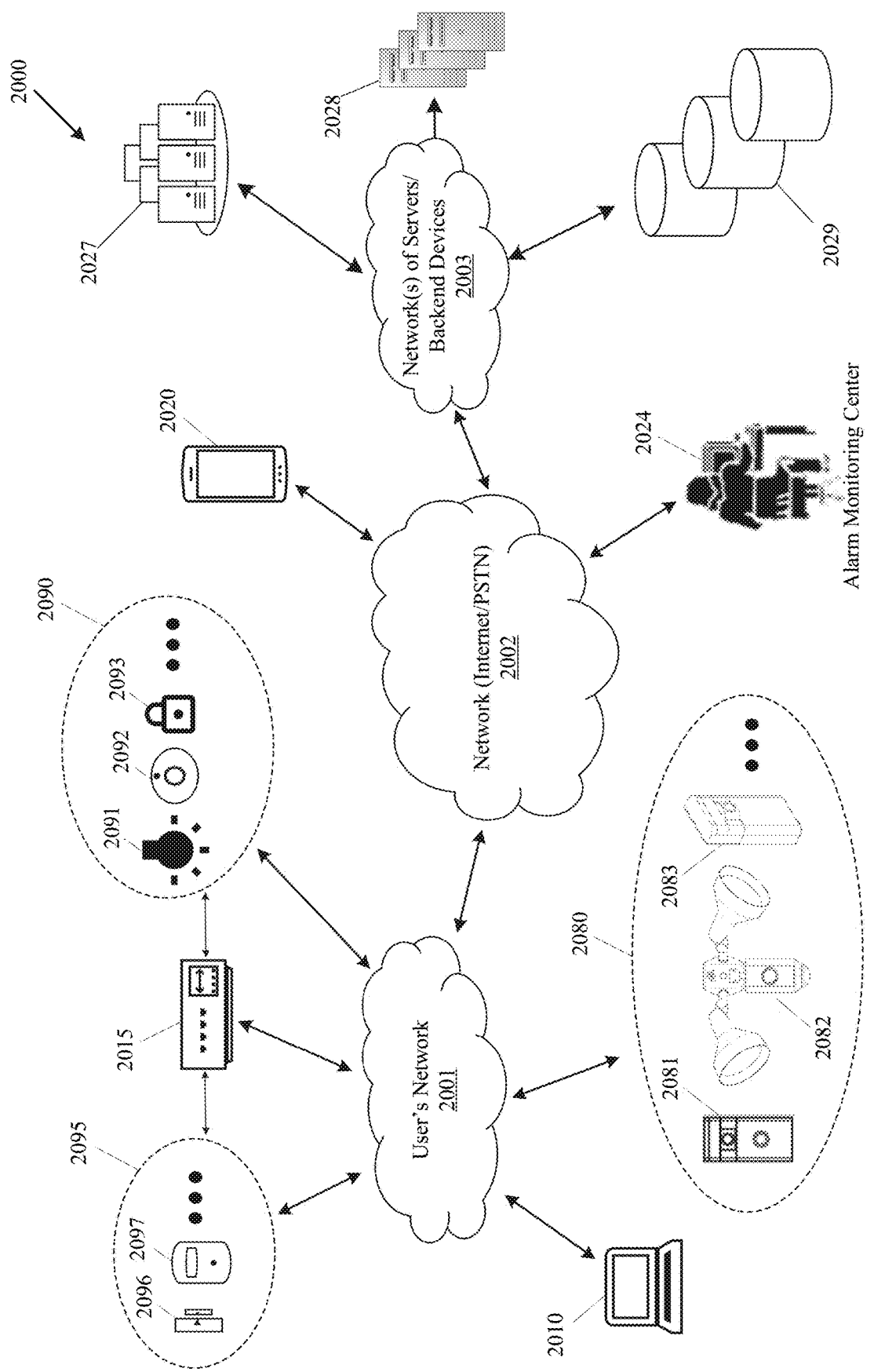
FIG. 20 is a functional block diagram illustrating a system including a hub device with which certain embodiments may be implemented, according to various aspects of present disclosure.

FIG. 20 is a functional block diagram illustrating a system including a hub device with which certain embodiments may be implemented, according to various aspects of present disclosure. A system 2000 for communication between several user devices is connected to a user's network (e.g., a home network) 2001, and remote servers and other remote devices connected to other networks 2002, 2003. Specifically, the user's network 2001, in some of the present embodiments, may include a hub device 2015, security/alarm devices 2095 and smart home devices 2090 associated with the hub device 2015, client device(s) 2010, and audio/video (A/V) recording and communication devices 2080. An alarm monitoring center 2024 and a client device 2020, among other entities and devices, may be connected to the public network 2002. Additionally, the backend network 2003 may include several backend devices, such as one or more remote storage devices 2029, one or more servers 2028, and one or more backend application programming interfaces (APIs) 2027.

The user's network 2001 may be, for example, a wired and/or wireless network (e.g., Ethernet network, Wi-Fi network, ZigBee network, Z-Wave network, etc.). Alternatively, or in addition, the user's network 2001 may comprise various networks such as a cellular/mobile network, a local network, a public network, a low-bandwidth network, and/or any other appropriate network. If the user's network 2001 is wireless, or includes a wireless component, the network 2001 may be a Wi-Fi network compatible with the IEEE 802.11 standard and/or other wireless communication standard(s).

As shown in FIG. 20, the user's network 2001 is connected to another network 2002, which may comprise, for example, the Internet and/or a public switched telephone network (PSTN). As described below, the security devices 2095, the smart home devices 2090, and the A/V recording and communication devices 2080 may communicate with the client devices 2010, 2020 via the network 2001 and the network 2002 (Internet/PSTN). In various embodiments, any or all of the hub device 2015, the security devices 2095, the smart home devices 2090, and the A/V recording and communication devices 2080 may communicate with the client devices 2010, 2020 directly (e.g., using one or more wireless technologies and/or protocols, such as Bluetooth, Bluetooth LE, ZigBee, Z-Wave, etc.). The network 2002 may be any wireless network or any wired network, or a combination thereof, configured to operatively couple the above-mentioned modules, devices, and systems as shown in FIG. 20. For example, the network 2002 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 20, the hub device 2015, in some of the present embodiments, may comprise any device that facilitates communication with and control of the alarm devices 2095 and the smart devices 2090. In some aspects of the present embodiments, the hub device 2015 may also facilitate communication with and control of the A/V recording and communication devices 2080. The hub device 2015 may be powered by a connection to an external power (e.g., AC mains). Additionally, the hub device 2015 may include an internal backup battery to which the hub device 2015 switches when the external power is disconnected.

The security devices 2095 and the smart devices 2090, in some of the present embodiments, may communicate with the hub device 2015 directly (e.g., using one or more wireless technologies and/or protocols, such as Bluetooth, Bluetooth LE, ZigBee, Z-Wave, etc.) and/or indirectly (e.g., via the user's network 2001). In some of the present embodiments, the A/V recording and communication devices 2080 may communicate with the hub device 2015 through one or more networks (e.g., the user's network 2001 and the network 2002). Although not shown in FIG. 20, in some embodiments, the hub device 2015 may communicate directly with the A/V recording and communication devices 2080 (e.g., via wired and/or wireless channels). The hub device 2015 may include any or all of the components and/or functionality of the network-connected device 102 described in detail above with reference to FIG. 1.

With continued reference to FIG. 20, the alarm devices 2095 may include, but are not limited to, monitoring sensors, such as contact sensors 2096 (e.g., door sensors, window sensors, etc.), motion sensors 2097, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 2095 are tripped (or triggered), the sensor may immediately transmit an intrusion event signal to the hub device 2015 via a communication path (e.g., a wireless and/or wired channel).

The smart devices 2090 may include, but are not limited to, indoor/outdoor lighting systems (e.g., smart light emitting diodes (LEDs) 2091), temperature control systems (e.g., thermostats 2092), locking control systems for doors and/or windows (e.g., smart locks 2093), shade/blind control systems (not shown), or any other automation (or smart home) devices that can communicate with, and be controlled by, the hub device 2015.

In some of the present embodiments, the hub device 2015 may be a component of a home automation system installed at a property of a user who is associated with the client devices 2010, 2020. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 2090 and the alarm devices 2095, when remotely monitored and controlled via the network (Internet/PSTN) 2002, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 2090 and the alarm devices 2095 may be controlled via a user interface in some of the present embodiments. The user interface may include any or all of a wall-mounted terminal, software installed on the client devices 2010, 2020 (e.g., a mobile application), a tablet computer or a web interface, and may communicate with Internet cloud services. In addition to communicating with, and/or controlling, the smart home devices 2090 and the alarm devices 2095, in various embodiments, the client devices 2010, 2020 may also be configured to be in network communication with, and/or controlling, the A/V recording and communication devices 2080 (e.g., via the networks 2001 and 2002). The client devices 2010, 2020 may comprise, for example, a mobile phone such as a smartphone, or a computing device such as a tablet computer, a laptop computer, a desktop computer, etc. The client devices 2010, 2020 may include any or all of the components and/or functionality of the client device 1600 described above with reference to FIG. 16.

With further reference to FIG. 20, the system 2000 may also include one or more A/V recording and communication devices 2080 (e.g., installed at the same property where the alarm devices 2095 and smart home devices 2090 are installed). The A/V recording and communication devices 2080 may include, but are not limited to, video doorbells 2081, lighting systems with A/V recording and communication capabilities (e.g., floodlight cameras 2082, spotlight cameras (not shown), etc.), security cameras 2083, or any other similar devices. The structure and functionality of the A/V recording and communication devices 2080 are described above with reference to FIGS. 13 and 14. As described above, in some embodiments, the user may control the A/V recording and communication devices 2080 using either or both of the client devices 2010, 2020. Additionally, in some embodiments, the user may control the A/V recording and communication devices 2080 through the hub device 2015 (e.g., using either or both of the client devices 2010, 2020). In some embodiments, however, the client devices 2010, 2020 may not be associated with an A/V recording and communication device.

As described above, a user may control the smart home devices 2090, the alarm devices 2095, and/or the A/V recording and communication devices 2080, using one or more applications executing on a client device of the user (e.g., the client device 2020). For example, the user may turn on/off the lights 2091, may turn up/down the temperature using the thermostat 2092, may lock/unlock the doors and windows through the locks 2092, etc. The user may also arm/disarm one or more of the security/alarm devices 2095 (and one or more of the A/V recording and communication devices 2080) using the client devices 2010, 2020.

With further reference to FIG. 20, the system 2000 may also include one or more remote storage devices 2029 (may be referred to interchangeably as "cloud storage device(s)"), one or more servers 2028, and one or more backend application programming interfaces (APIs) 2027 that are connected to network 2003. The network 2003 may be similar in structure and/or function to the above-described user's network 2001. The hub 2015 (and in some embodiments the hub's associated security devices 2095 and smart devices 2090) and/or the A/V recording and communication devices 2080 may communicate with, and be managed by, the remote servers 2028 and APIs 2027 through the networks 2001, 2002, and 2003. Examples of such communications are described below.

While FIG. 20 illustrates the storage devices 2029, the servers 2028, and the backend APIs 2027 as components of the network 2003 and separate from the network 2002, in some aspects of the present embodiments, one or more of the storage devices 2029, the servers 2028, and the backend APIs 2027 may be components of the network 2002. Additionally, in some embodiments, the storage devices 2029 may be separate from the backend servers 2028 or may be an integral component of the backend servers 2028. Any of the backend APIs 2027 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 2027 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 2027 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 20, the system 2000 may also include the security/alarm monitoring center 2024. In some embodiments, each time the hub 2015 receives an intrusion alert signal from one or more of the security/alarm devices 2095 (e.g., when one or more of the sensors 2096 and/or 2097 are triggered), the hub 2015 may send a security breach signal to the security/alarm monitoring center 2024. In addition to the hub 2015, the A/V recording and communication devices 2080 of some embodiments may also send a security breach signal to the security/alarm monitoring center 2024 when these devices determine that an emergency situation has occurred. For example, when one of the A/V recording and communication devices 2080 (e.g., the floodlight camera 2082) detects a suspicious person and/or activity in an area about the location of the A/V recording and communication device, the device may send a security breach signal to the alarm monitoring center 2024.

The security/alarm monitoring center 2024 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 2010, 2020. Typically, when the security/alarm monitoring center 2024 does not receive an acknowledgment from the user, or receive an acknowledgment in which the user informs the center of an emergency situation (e.g., the user is away from home), the monitoring center may contact an emergency call center (not shown in the communication system 2000). The emergency call center may comprise a local 911 call center that serves a region in which the hub 2015 is located. The emergency call center may also be reached by the client devices 2010, 2020, and/or the backend devices 2027, 2028 directly (e.g., using a PSTN) or indirectly (e.g., through the networks 2001, 2002, and 2003).

In some alternative embodiments, the security monitoring center 2024 may not be a separate entity different from the backend servers 2028 (and/or the backend APIs 2027). For example, in some of the present embodiments, the backend servers 2028 may monitor the home security devices 2095 and/or the hub 2015 (and other security systems not shown in the figures) in addition to managing the hub 2015 and/or the A/V recording and communication devices 2080.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

In a first aspect, a method temporarily disables notification of events detected by a security device. A network-connected device receives a message from the security device indicating detection of an event within an area monitored by the security device and determines that a first client device of one or more client devices associated with the security device is nearby the security device. A notification table is evaluated to determine which of the one or more client devices should not receive a notification of the event, and the notification of the event to the one or more client devices associated with the security device is suppressed based on the determining that the first client device of the one or more client devices associated with the security device is nearby the security device and based on the evaluating of the notification table to determine which of the one or more client devices should not receive the notification of the event.

In certain embodiments of the first aspect, the network-connected device comprises at least one of a back-end cloud server, a home automation hub, and a premises security hub.

In certain embodiments of the first aspect, determining that the first client device is nearby the security device comprises receiving, at the network-connected device, a message from the security device indicating that a wireless signal from the first client device was received at the security device.

Certain embodiments of the first aspect further comprise determining whether the first client device is wirelessly connected to a local network to which the security device is connected, the first client device being nearby the security device when wirelessly connected to the local network.

Certain embodiments of the first aspect further comprise determining whether a signal strength of a wireless signal between the first client device and the security device is increasing in strength, the first client device being nearby the security device when the signal strength is increasing.

In certain embodiments of the first aspect, determining that the first client device is nearby the security device comprises determining that a signal strength of a short-range wireless signal between the first client device and the security device is increasing.

In certain embodiments of the first aspect, suppressing the notification of the event to the one or more client devices includes suppressing the notification of the event to the first client device.

Certain embodiments of the first aspect further comprise receiving configuration of the notification table from one of the client devices.

In certain embodiments of the first aspect, the evaluating of the notification table includes evaluating a flag corresponding to a second client device of the client devices associated with the security device, the flag being set in the notification table in response to a notification suppression request from a requesting client device of the client devices associated with the security device, and suppressing notification of the event to the second client device based on the flag.

In certain embodiments of the first aspect, the evaluating of the notification table further comprises evaluating an additional flag corresponding to a third client device of the client devices associated with the security device, the additional flag being set in the notification table in response to an additional notification suppression request received from one of the client devices other than the requesting client device, and suppressing notification of the event to the third client device based on the additional flag.

In a second aspect, a method temporarily suppresses security event notifications to a client device. A network-connected device receives an event message indicative of an event detected by a security device associated with the client device and from the security device. A notification is generated at the network-connected device and sent from the network-connected device to the client device. A suppression request indicative of a user of the client device activating a suppress button displayed concurrently with the notification at the client device is received from the client device. Sending of further notifications associated with the security device to the client device is suppressed for a suppression period corresponding to the suppress button.

In certain embodiments of the second aspect, the suppress button comprises a plurality of duration buttons, each duration button being associated with a different suppression duration, the suppression request defining the suppression duration based upon user activation of one of the duration buttons.

In certain embodiments of the second aspect, the suppress button is implemented as a custom action of the notification.

In certain embodiments of the second aspect, the notification is associated with an application running on the client device, and the notification includes a custom action to invoke the application to send the suppression request to the network-connected device.

In certain embodiments of the second aspect, suppressing the sending of further notifications comprises: starting a timer at the network-connected device to run for the suppression period, and, while the timer is running, suppressing generation and sending of further notifications to the client device of events detected at the security device.

In certain embodiments of the second aspect, suppressing the sending of further notifications comprises sending a message from the network-connected device to the security device indicating the suppression period, wherein the security device suppresses generation of event messages for the suppression period.

In a third aspect, a method temporarily suppresses security event notifications to a client device. A client device receives, from a network-connected device, a notification indicative of an event detected by a security device associated with the client device. The notification is displayed concurrently with a suppress button. In response to activation of the suppress button, a suppression request identifying the security device and specifying a suppression duration is generated and the suppression request is sent to the network-connected device to suppress further notifications related to future events at the security device for the suppression duration.

In certain embodiments of the third aspect, the suppress button comprises a plurality of duration buttons, each associated with a different suppression duration, and the suppression request defines the suppression duration based upon user activation of one of the duration buttons.

In certain embodiments of the third aspect, the suppress button is implemented as a custom action of the notification.

In certain embodiments of the third aspect, the notification is associated with an application running on the client device, and the notification includes a custom action to invoke the application to generate and send the suppression request to the network-connected device.

Changes may be made in the above embodiments without departing from the scope of the present embodiments. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A method comprising:
   storing first data that associates a first user device with a camera device;
   receiving second data indicating that the camera device detected a first event;
   based at least in part on the receiving of the second data, determining that the first user device is located proximate to the camera device;
   based at least in part on the first user device being located proximate to the camera device, refraining from sending a first notification associated with the first event to the first user device;
   receiving image data generated by the camera device, the image data representing the first event; and
   storing the image data;
   wherein the determining that the first user device is located proximate to the camera device comprises:
   receiving location data from the first user device;
   determining that the location data represents a location; and
   determining that the location is within a threshold distance to the camera device.

2. A method comprising:
   storing first data that associates a first user device with a camera device located at a first site;
   receiving second data indicating that the camera device detected a first event;
   based at least in part on the receiving of the second data, determining that the first user device is located proximate to the camera device;
   based at least in part on the first user device being located proximate to the camera device, refraining from sending a first notification associated with the first event to the first user device;
   receiving image data generated by the camera device, the image data representing the first event;
   storing the image data; and
   receiving third data indicating a signal strength of a wireless signal communicated between the first user device and the camera device, wherein the determining that the first user device is located proximate to the camera device comprises determining that the first user device is located proximate to the camera device based at least in part on the signal strength.

3. The method of claim 2, wherein the wireless signal is a short-range wireless signal.

4. The method of claim 1, further comprising:
   storing third data that associates a second user device with the camera device; and
   based at least in part on the first user device being located proximate to the camera device, refraining from sending a second notification associated with the first event to the second user device.

5. A camera device comprising:
   one or more sensors;
   one or more wireless transceivers;
   one or more processors; and
   one or more computer-readable media storing instructions that, when executed by the one or more processors, cause the one or more processors to perform operations comprising:
   receiving sensor data generated by the one or more sensors;
   detecting, using the sensor data, an event;
   receiving, using the one or more wireless transceivers, a first wireless signal from a user device;
   determining one or more signal strength values of the wireless signal received from the first user device;
   sending, using the one or more wireless transceivers, first data representing the event to one or more computing devices; and
   sending, using the one or more wireless transceivers, second data based on the one or more signal strength values to the one or more computing devices.

6. The camera device of claim 5, the one or more computer-readable media storing further instructions that, when executed by the one or more processors, cause the one or more processors to perform further operations comprising:
   deactivating at least a wireless transceiver from the one or more wireless transceivers; and
   activating the wireless transceiver based at least in part on the detecting of the event,
   wherein the camera device receives the identifier data using the wireless transceiver.

7. The method of claim 1, further comprising sending a second notification associated with the first event to a second user device associated with the camera device.

8. The method of claim 1, wherein the storing of the first data that associates the first user device with the camera device comprises:
   storing first identifier data associated with the first user device;
   storing second identifier data associated with the camera device; and
   storing the first data that associates the first identifier data with the second identifier data.

9. The method of claim 1, wherein the determining that the first user device is located proximate to the camera device comprises:
   receiving identifier data from the camera device; and
   determining that the identifier data is associated with the first user device.

10. The method of claim 1, wherein the determining that the first user device is located proximate to the camera device comprises:
    receiving identifier data from the first user device; and
    determining that the identifier data is associated with the camera device.

11. A method comprising:
    storing first data that associates a first user device with a camera device located at a first site;
    receiving second data indicating that the camera device detected a first event;

based at least in part on the receiving of the second data, determining that the first user device is located proximate to the camera device;
based at least in part on the first user device being located proximate to the camera device, refraining from sending a first notification associated with the first event to the first user device;
receiving image data generated by the camera device, the image data representing the first event; and
storing the image data;
wherein the determining that the first user device is located proximate to the camera device is based on
a determination that the camera device and
the first user device are both connected to a first network local to the first site.

12. The method of claim 1, further comprising:
receiving third data indicating that the camera device detected a second event;
based at least in part on the receiving of the third data, determining that the first user device is no longer located proximate to the camera device; and
sending a second notification associated with the second event to the first user device.

13. The camera device of claim 5, wherein:
one or more sensors comprise a camera;
the sensor data comprise image data; and
the detecting of the event comprises determining that the image data represents an object.

14. The camera device of claim 5, the one or more computer-readable media storing further instructions that, when executed by the one or more processors, cause the one or more processors to perform further operations comprising:
storing second identifier data associated with the user device;
determining that the first identifier data is similar to the second identifier data; and
determining that the user device is located proximate to the camera device based at least in part on the first identifier data being similar to the second identifier data.

15. The camera device of claim 5, the one or more computer-readable media storing further instructions that, when executed by the one or more processors, cause the one or more processors to perform further operations comprising:
determining that the first identifier data is associated with the user device,
wherein the sending of the first identifier data is based at least in part on the first identifier data being associated with the user device.

16. A system comprising:
one or more processors; and
one or more computer-readable media storing instructions that, when executed by the one or more processors, cause the system to perform operations comprising:
storing first data that associates a camera device with a user device;
determining that the camera device detected an event;
based at least in part on the camera device detecting the event, determining that the user device is located proximate to the camera device, wherein the determining that the user device is located proximate to the camera device comprises:
receiving location data from the user device;
determining a location associated with the location data; and
determining that the location is within a threshold distance to the camera device; and
based at least in part on the user device being located proximate to the camera device, refraining from sending a notification associated with the event.

17. The system of claim 16, wherein the determining that the user device is located proximate to the camera device comprises:
receiving identifier data from the user device; and
determining that the identifier data is associated with the camera device.

18. The system of claim 16, wherein the determining that the user device is located proximate to the camera device comprises:
receiving identifier data from the camera device; and
determining that the identifier data is associated with the user device.

19. The system of claim 16, wherein the determining that the camera device detected the event comprises receiving, from the camera device, second data indicating that the camera device detected the event.

* * * * *